(12) United States Patent
Le et al.

(10) Patent No.: US 6,882,637 B1
(45) Date of Patent: *Apr. 19, 2005

(54) METHOD AND SYSTEM FOR TRANSMITTING AND RECEIVING PACKETS

(75) Inventors: Khiem Le, Coppell, TX (US); Christopher Lamonte Clanton, Richardson, TX (US); Haihong Zheng, Coppell, TX (US); Zhigang Liu, Irving, TX (US)

(73) Assignee: Nokia Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/536,639

(22) Filed: Mar. 28, 2000

Related U.S. Application Data

(60) Provisional application No. 60/159,360, filed on Oct. 14, 1999.

(51) Int. Cl.[7] .............................. H04J 3/06; H03M 7/00; G06F 15/16
(52) U.S. Cl. ........................ 370/349; 370/350; 370/474; 341/60; 375/240.07; 375/240.28; 709/247
(58) Field of Search ................................ 370/349, 350, 370/389, 392, 394, 395.1, 396.6, 395.61, 465, 470, 471, 474, 521; 341/51, 60; 348/461, 464, 465, 467, 469; 375/240, 240.02, 240.07, 240.25, 240.26, 240.28; 709/236, 246, 247; 714/748, 749, 750, 775, 776; 725/87, 91, 93, 94, 95, 98

(56) References Cited

U.S. PATENT DOCUMENTS

| | | | |
|---|---|---|---|
| 4,617,657 A | 10/1986 | Drynan et al. ................ 370/60 |
| 5,293,379 A | * 3/1994 | Carr ............................ 370/474 |
| 5,446,736 A | * 8/1995 | Gleeson et al. ............. 370/473 |
| 5,579,316 A | * 11/1996 | Venters et al. .............. 370/392 |
| 5,627,829 A | 5/1997 | Gleeson et al. ............. 370/230 |

(Continued)

FOREIGN PATENT DOCUMENTS

| | | | |
|---|---|---|---|
| EP | 0763944 | 3/1997 | ............ H04N/7/50 |
| EP | 0933949 | 8/1999 | ............ H04N/7/52 |
| EP | 1056259 | 11/2000 | ........... H04L/29/06 |
| JP | 57184349 | 11/1982 | ............. H04L/1/00 |
| WO | 9858469 | 12/1998 | ............. H04L/1/18 |
| WO | 0079764 | 12/2000 | ........... H04L/29/06 |

OTHER PUBLICATIONS

Mathur S; Lewis M: "Compressing IPX Headers Over WAN Media (CIPX)" IETF: Request for Comments 1553, Dec. 31, 1993, pp. 1–23, XP002162392.

(Continued)

*Primary Examiner*—Alpus H. Hsu
(74) *Attorney, Agent, or Firm*—Antonelli, Terry, Stout & Kraus, LLP

(57) ABSTRACT

The invention is a system and method for synchronizing the transmission of compressed headers in data packets between a transmitter and a receiver having a preferred wireless application which is an improvement of RFC2508. In a system having a transmitter transmitting a plurality of packets each containing a header to a receiver, a method of synchronizing the transmission of compressed headers between the transmitter and receiver in accordance with the invention includes transmitting a current packet from the transmitter to the receiver containing information that the transmitter is prepared to send subsequently transmitted packets in which the headers therein are to be compressed in comparison to the header contained in the current packet; and transmitting from the receiver to the transmitter an acknowledgment packet that the receiver has received the current packet.

97 Claims, 20 Drawing Sheets

U.S. PATENT DOCUMENTS

| | | | | |
|---|---|---|---|---|
| 5,835,730 | A | * 11/1998 | Grossman et al. | 709/247 |
| 6,032,197 | A | * 2/2000 | Birdwell et al. | 709/247 |
| 6,041,054 | A | * 3/2000 | Westberg | 370/389 |
| 6,198,735 | B1 | * 3/2001 | Pazhyannur et al. | 370/349 |
| 6,300,887 | B1 | * 10/2001 | Le | 341/60 |
| 6,304,914 | B1 | * 10/2001 | Deo et al. | 709/247 |
| 6,542,931 | B1 | * 4/2003 | Le et al. | 709/228 |

OTHER PUBLICATIONS

Casner & Jacobson et al: "Compressing IP/UDP/RTP Headers for Low–Speed Serial Links" IETF: Request for Comments 2508, pp. 1–24, Aug. 1999, XP002133454.

Degermark M et al: "Low–Loss TCP/IP Header Compression for Wireless Networks", Wireless Networks, ACM, US, vol. 3, No. 5, Oct. 1, 1997, pp. 375–387, XP000728935 ISSN: 1022–0038.

Degermark M: "RFC2507: IP Header Compression", IP Header Compression, Network Working Group, XX, XX, Mar. 1, 1999, pp. 1–47, XP002157130.

* cited by examiner

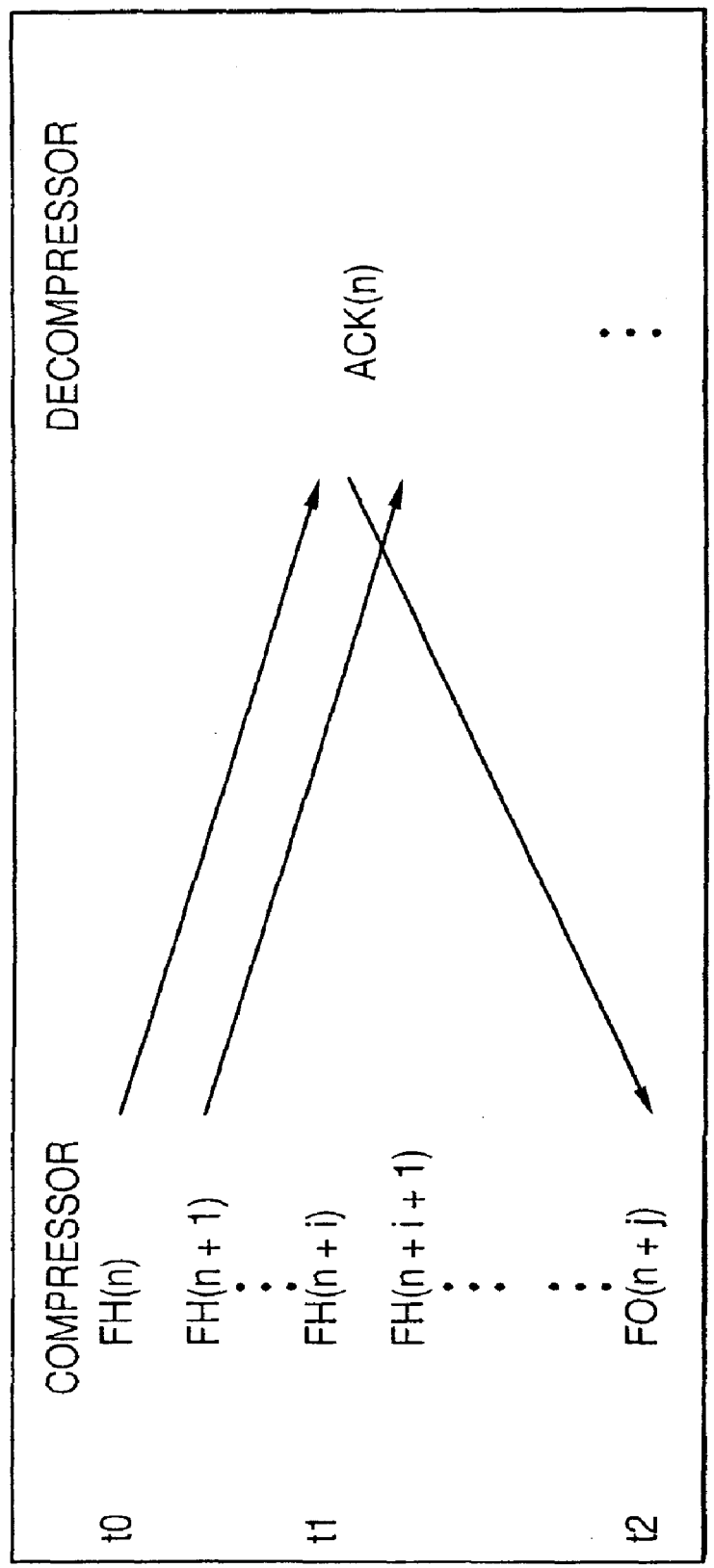

FIG. 14A 1. SO Packet  (PT = 0)

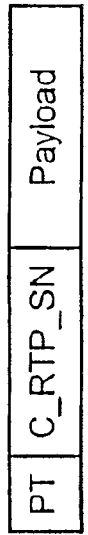

FIG. 14B 2. ACK Packet  (PT = 10)

FIG. 14C 3. FO Packet  (PT = 110)

M – Marker Bit in the RTP Header (1 bit)
T – Flag which is set to 1 if C_RTP_TS is present, 0 otherwise (1 bit)
I – Flag which is set to 1 if C_IP_ID is present, 0 otherwise (1 bit)

FIG. 14D 4. FH Packet  (PT = 1110)

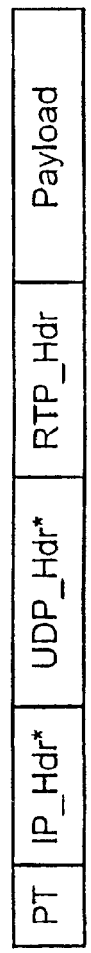

\* The length fields in IP and UDP header in FH packets can be replaced with header compression information, assuming the packet length is provided by the lower layer at the decompressor side.

FIG. 14E

5. FO_EXT Packet  ( PT = 11110 )

| PT | C_RTP_SN | M | C_RTP_TS | C_IP_ID | Bit Mask | Field Values | Payload |

- FO_EXT packet will be transmitted only if one or several non-essential fields have changed. The Bit Mask is used to indicate which fields are present in this packet.
- C_RTP_TS and C_IP_ID will be always present in a FO_EXT packet. Therefore, T and I bit-flag are not necessary.

FIG. 14F

6. FH_REQ Packet  ( PT = 111110 )

| PT |

Full header request packet will be sent only under exceptional situations, e.g., system crash

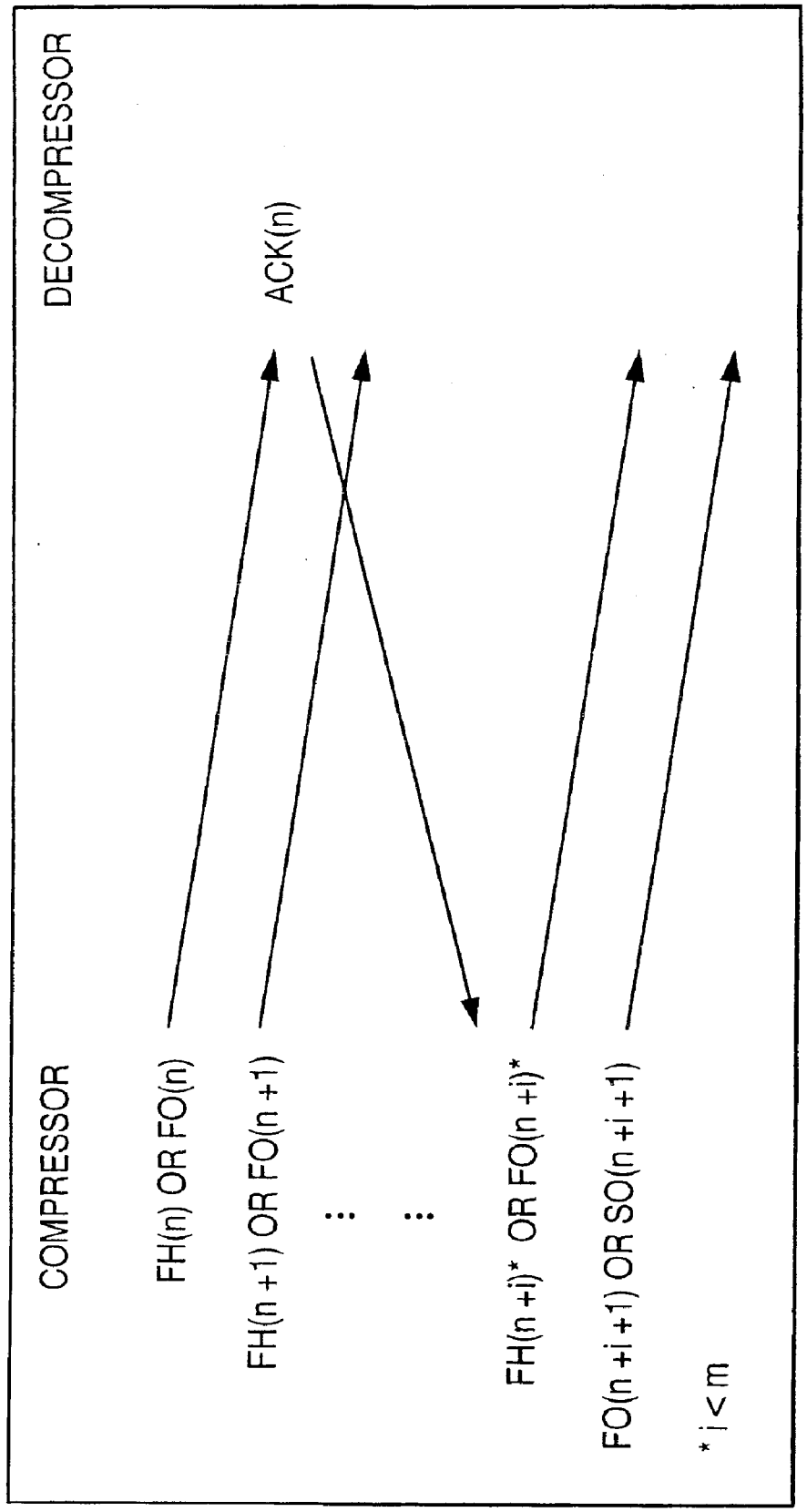

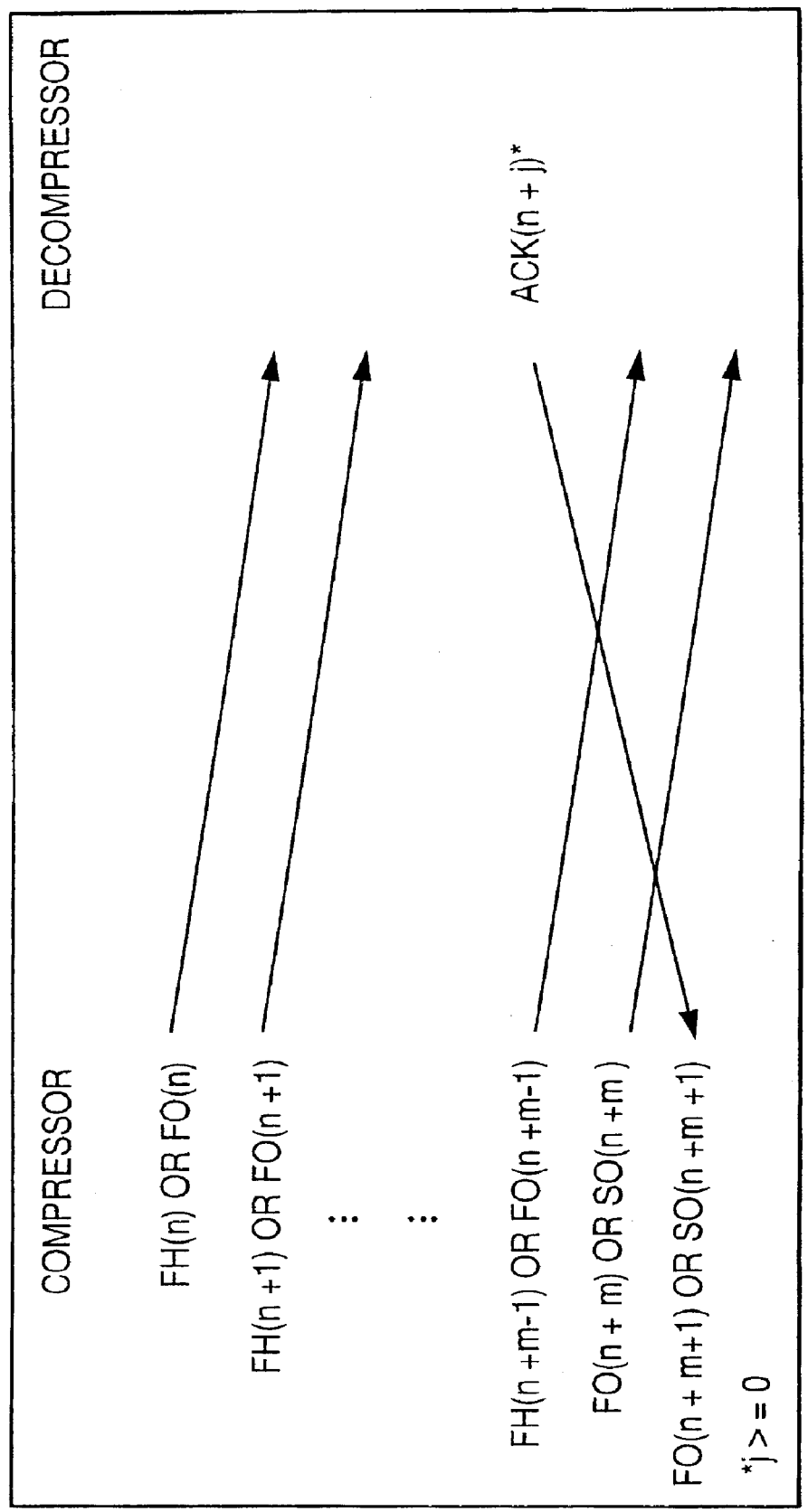

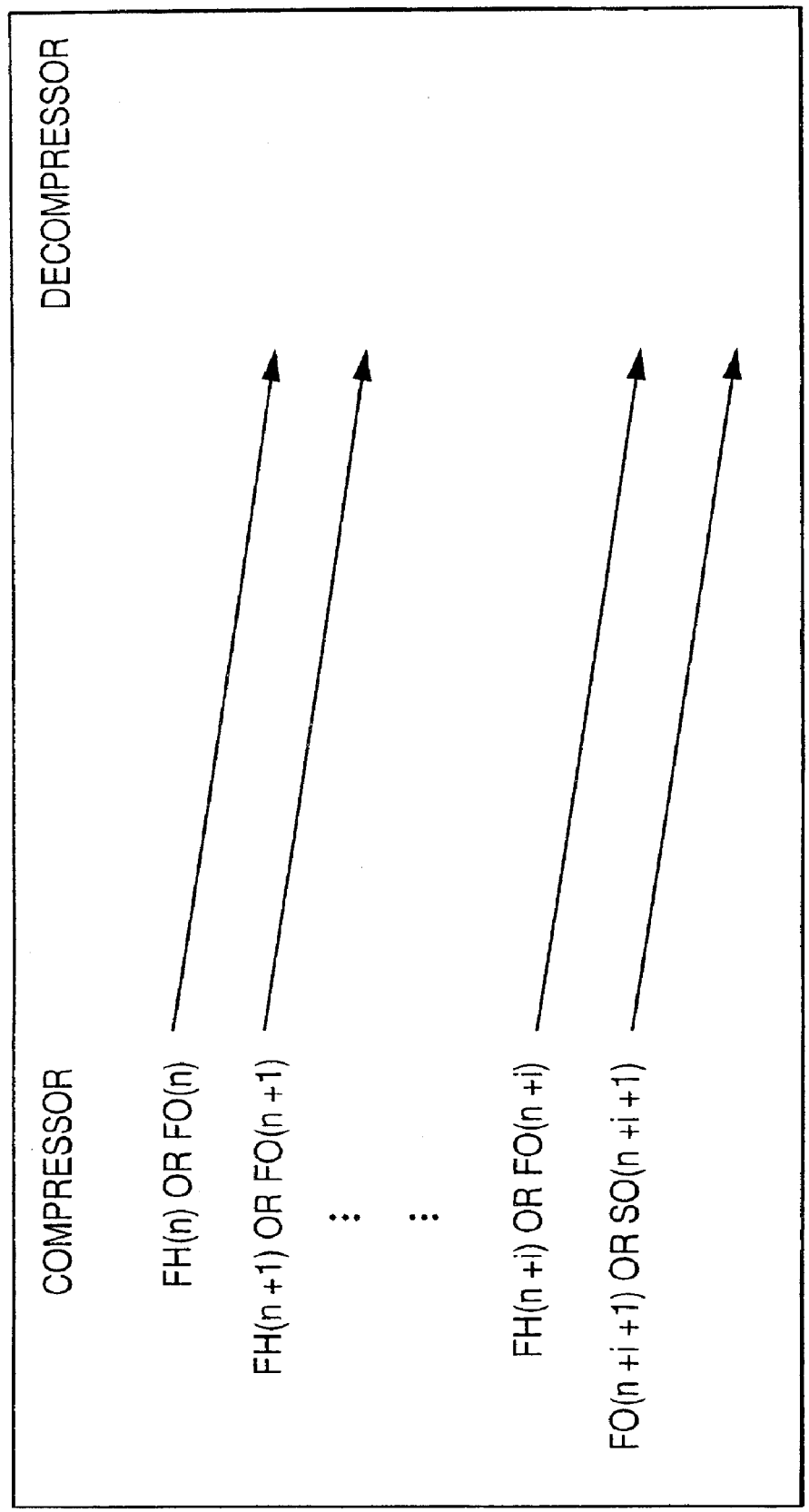

METHOD AND SYSTEM FOR TRANSMITTING AND RECEIVING PACKETS

CROSS REFERENCE TO RELATED APPLICATIONS

This application claims the filing date of U.S. provisional application Ser. No. 60/159,360, filed Oct. 14, 1999, entitled "Method and System for Transmitting and Receiving Data Packets".

Reference is also made to U.S. patent application Ser. No. 09/522,497, entitled "An Efficient Handoff Procedure for Header Compression", filed on Mar. 9, 2000, which application is incorporated herein by reference in its entirety.

Reference is also made to U.S. patent application Ser. No. 09/536,618, entitled "Variable Length Encoding of Compressed Data", filed on even date herewith, which application is incorporated herein by reference in its entirety.

BACKGROUND OF THE INVENTION

1. Field of the Invention

The present invention relates to compression and decompression of headers in data packet transmissions.

2. Description of the Prior Art

For Internet Protocol (IP) based real-time multimedia, the Real-Time Transfer Protocol (RTP) is predominantly used on top of the User Datagram Protocol (UDP/IP). RTP is described in detail in RFC 1889 which is incorporated herein by reference in its entirety. The size of the combined IP/UDP/RTP headers is at least 40 bytes for IPv4 and at least 60 bytes for IPv6. A total of 40–60 bytes overhead per packet may be considered heavy in systems (e.g., such as cellular networks) where spectral efficiency is a primary concern. Consequently, a need exists for suitable IP/UDP/RTP header compression mechanisms. A current header compression scheme is described in RFC 2508, by S. Casner, V. Jacobson, "Compressing IP/UDP/RTP Headers for Low Speed Serial Links", Internet Engineering Task Force (IETP), February 1999, which is incorporated herein by reference in its entirety, and which is able to compress the 40/60 byte IP/UDP/RTP header down to 2 or 4 bytes over point-to-point links. The existing header compression algorithms are based on the observation that most fields of the IP packet headers remain constant in a packet stream during the length of a session. Thus, it is possible to compress the header information by establishing a compression state (the full header information) at the de-compressor and by simply carrying minimal amount of header information from the compressor to the de-compressor.

IP/UDP/RTP header compression schemes, as described for example in RFC 2508, take advantage of the fact that certain information fields carried in the headers either 1.) do not change ('Type 1' header fields) or 2.) change in a fairly predictable way ('Type 2' header fields). Other fields, referred to as 'Type 3' header fields, vary in such a way that they must be transmitted in some form in every packet (i.e. they are not compressible).

Examples of Type 1 header fields are the IP address, UDP port number, RTP SSRC (synchronization source), etc. These fields need only be transmitted to the receiver/decompressor once during the course of a session (as part of the packet(s) transferred at session establishment, for example). Type 1 fields are also called 'unchanging' fields.

Examples of Type 2 header fields are the RTP time stamp, RTP sequence number, and IP ID fields. All have a tendency to increment by some constant amount from packet(n) to packet (n+1). Thus, there is no need for these values to be transmitted within every header. It is only required that the receiver/decompressor be made aware of the constant increment value, hereafter referred to as the first order difference (FOD), associated with each field that exhibits this behavior. Receiver/decompressor utilizes these FODs to regenerate up-to-date Type 2 field values when reconstructing the original header. Type 2 fields are part of 'changing' fields.

It should be emphasized that, on occasion, Type 2 fields will change in some irregular way. Frequency of such events depends on several factors, including the type of media being transmitted (e.g., voice or video), the actual media source (e.g., for voice, behavior may vary from one speaker to another), and the number sessions simultaneously sharing the same IP-address.

An Example of a Type 3 header field is the RTP M-bit (Marker), which indicates the occurrence of some boundary in the media (e.g., end of a video frame). Because the media normally varies in unpredictable ways, this information cannot be truly predicted. Type 3 fields are part of 'changing' fields.

The decompressor maintains decompression context information that contains all the pertinent information related to rebuilding the header. This information is mainly type 1 fields, FOD values, and other information. When packets are lost or corrupted, the decompressor can lose synchronization with the compressor such that it can no longer correctly rebuild packets. Loss of synchronization can occur when packets are dropped or corrupted during transmission between compressor and decompressor.

Given the above, the compressor needs to transmit three different types of headers during the course of a session:

Full Header (FH): Contains the complete set of all header fields (Types 1, 2, and 3). This type of header is the least optimal to send due to its large size (e.g., 40 bytes for IPv4). In general, it is desirable to send an FH packet only at the beginning of the session (to establish Type 1 data at the receiver). Transmission of additional FH packets has adverse effects on the efficiency of the compression algorithm. When the compressor transmits FH packets, it is said to be in the 'FH state'.

First Order (FO): Contains minimal header information (e.g. Type 3 fields), compressor/decompressor specific control fields (specific to the compression algorithm in use), and information describing changes in current FOD fields. An FO packet is basically an SO packet (described below), with additional information that establishes new FOD information for one or more Type 2 fields at the decompressor. If the header compression is being applied to a VoIP (voice over internet protocol) stream, transmission of an FO packet might be triggered by the occurrence of a talk spurt after a silence interval in the voice. Such an event results in some unexpected change in the RTP time stamp value, and a need to update the RTP time stamp at the receiver by a value other than the current FOD. The size of FO packets depends on the number of Type 2 fields whose first order difference changed (and the amount of the absolute value of each change). When the compressor transmits FO packets, it is said to be in the 'FO state'.

Second Order (SO); A SO packet contains minimal header information (e.g. Type 3 fields), and compressor and decompressor specific control fields. The preferred mode of operation for the compressor and decompressor is transmission and reception of SO packets, due to their minimal size (on the order of just 2 bytes or even less). When the compressor transmits SO packets, it is said to be in the 'SO state'. SO packets are transmitted only if the current header fits the pattern of an FOD.

RFC 2508 is based on the concept that most of the time, the RTP fields that change from one packet to the next, such as the RTP time stamp, can be predicted by linear extrapolation of transmitted SO packets. Essentially the only information that has to be sent is a sequence number, used for error and packet loss detection (as well as a context information ID). When the transmitter determines that linear extrapolation cannot be applied to the current packet with respect to the immediately preceding packet, a FO packet is transmitted. To initiate the session, a FH packet is transmitted. In addition, when the receiver determines that there is packet loss (as detected by a sequence number incrementing by more than 1) the receiver will explicitly request the transmitter to transmit the full header in order to allow a resynchronization.

However, the header compression defined in RFC 2508 is not well suited for certain environments (such as cellular or wireless environments), where bandwidth is at a premium and errors are common. In the RFC 2508 header compression scheme, the RTP time stamp is assumed to have most of the time a linearly increasing pattern. When the header conforms to the pattern, essentially only a short sequence number sent as SO is needed in the compressed header. When the header does not conform to the pattern, the difference between the RTP time stamps of the current header and of the previous one is sent in the FO compressed header.

The additional bandwidth requirement can manifest itself in various ways, depending on the operating environment. For example, in cellular systems it is in general very desirable to limit bandwidth usage as much as possible, as it is a scarce resource.

RFC 2508 suffers from lack of robustness to withstand header errors or losses, because the decompression of the current header can only be done if the immediately preceding header was also received without error and decompressed. The header compression defined in RFC 2508 is not well suited for cellular environments, where bandwidth is at a premium and long error bursts are not uncommon. In RFC 2508, when a packet loss is detected, subsequent packets with compressed headers are invalidated, with a further requirement that it is necessary to send a large size header to recover from the error. Large size headers consume bandwidth and create peaks in the bandwidth demand which are more difficult to manage.

Just using a short sequence number (one with a limited number of bits) to detect packet loss is not robust to an error-prone network, such as in a wireless network where long loss may happen at any time. In this case, long loss is defined as loss of sequence cycle or packets in a row. Under the situation of a long loss, a series of packets within the number of packets of the sequence cycle having a packet identification defined by a limited number of bits may get lost and, as a result, the sequence number in the packet received by the decompressor (receiving device in uplink or downlink) of the receiver wraps around (repeats). For example, assuming the sequence number consists of k bits, the sequence cycle equals to $2^k$.

As shown in FIG. 1, the compressor (transmitting device in uplink or downlink) sent packet with seq=n at time $t_0$, and the following $2^k$ packets, beginning from packet with seq= n+1 at time t1 and ending at packet with seq=n at time $t_2$. At time $t_3$, the compressor sends a packet with sequence number equal to n+1 again. Assume a packet with a sequence number equal to n+1 sent at time $t_1$ until the packet with the sequence number equal to n is sent at time $t_2$ which are all lost due to long loss, then the decompressor only receives the packet with the sequence number equal to n sent at time $t_0$ and the packet with the sequence number equal to n+1 sent at time $t_3$. Based on the current packet loss detection scheme defined in RFC 2508, the decompressor concludes that there is no packet loss and decompresses the packet in a wrong way. This not only affects the correctness of decompression of packet with a sequence number equal to n+1, but the subsequent packets as well.

SUMMARY OF THE INVENTION

The present invention is a system and method which provides improved transmission and reception of packets in environments, such as wireless communications, which are prone to periodic interruption of packet reception such as that caused by fading, etc. The invention provides improved performance of packet transmission and reception in comparison to RFC 2508 including elimination of the wrap around problem of the prior art discussed above in FIG. 1. Proper decoding of a compressed header in a current packet in accordance with the invention is not dependent on correct decompression of an immediately preceding packet as with RFC 2508.

This invention provides a mechanism which detects long loss at the header compression level, as well as a corresponding recovery scheme after detection of long loss. The invention is generally applicable to communication protocols where sequence synchronization must be maintained between the transmitter and the receiver, in the presence of long error bursts.

Adaptive header compression is a general framework for robust header compression, that can be parameterized to account for the existence/non-existence and performance characteristics of a reverse channel. The framework includes three basic modes of operation:

Bidirectional Deterministic Mode: This mode is used in the case where there is a 'well-defined' reverse channel, which can be used to carry various types of feedback information from the decompressor to the compressor. One example of such feedback from the decompressor is an acknowledgment, used, e.g., to advance from a lower compression state to a higher compressor state.

Bidirectional Opportunistic Mode: This mode of operation is used in the case where a reverse channel exists, but is 'loosely' defined, i.e., the channel may not always be available, or may be slow/unreliable.

Unidirectional Mode (Pessimistic or Optimistic): This mode of operation is used when there is no reverse channel of any kind.

In a system having a transmitter transmitting a plurality of packets each containing a header to a receiver, a method of synchronizing the transmission of compressed headers between the transmitter and receiver in accordance with the invention includes transmitting a current packet from the transmitter to the receiver containing information that the transmitter is prepared to send in subsequently transmitted packets in which the headers therein are to be compressed in comparison to the header contained in the current packet; and transmitting from the receiver to the transmitter an acknowledgment packet that the receiver has received the current packet. The transmitter may store the header of the current packet which has been acknowledged as being received by the receiver as a reference header which is used in the transmission of the subsequently transmitted packets as a reference header to be used by the receiver to decompress the headers of subsequently transmitted packets; the receiver may store the header of the current packet, which is acknowledged as a reference header, for decompressing the compressed headers of the subsequently transmitted packets; the transmitter may transmit the subsequent packets using the stored header of the current packet as a reference header, and the receiver may use the stored reference header to decompress the compressed headers of the subsequently received packets to produce a full header which is not compressed. The header of the current packet may be a full header, and the compressed header of the subsequently transmitted packets may be a first order compressed header; the header of the current packet may be a first order compressed header; and the compressed header of the subsequently transmitted packets may be a second order compressed header; and the header of the current packet may be a full header; and the compressed header of the subsequently transmitted packets may be a second order compressed header.

A system in accordance with the invention includes a transmitter which transmits a plurality of packets each containing a header, a receiver which receives the transmitted plurality of packets; and wherein the transmitter transmits a current packet to the receiver containing information that the transmitter is prepared to send in subsequently transmitted packets in which the headers therein are to be compressed in comparison to the current packet and the receiver transmits an acknowledgment packet that the receiver has received the current packet. The transmitter may store the header of the current packet, which has been acknowledged as being received by the receiver, as a reference header that is used in the transmission of the subsequently transmitted packets as a reference header to be used by the receiver to decompress the subsequent headers; the receiver may store the header of the current packet which is acknowledged as a reference header for decompressing the compressed headers of the subsequently transmitted packets; the transmitter may transmit the subsequent packets using the stored header of the current packet as a reference header; and the receiver may use the stored reference header to decompress the compressed headers of the subsequently transmitted received packets to produce a full header which is not compressed. The header of the current packet may be a full header; and the compressed header of the subsequently transmitted packets may be a first order compressed header, the header of the current packet may be a first order compressed header; and the compressed header of the subsequently transmitted packets may be a second order compressed header; and the header of the current packet may be a full header; and the compressed header of the subsequently transmitted packets may be a second order compressed header.

In a system having a transmitter transmitting a plurality of packets each containing a header to a receiver, a method of decompressing a compressed header contained in a packet currently received by the receiver in accordance with the invention includes determining with a counter at the receiver an elapsed time $\Delta t$ between consecutively received packets; comparing the elapsed time $\Delta t$ between the currently received packet and an immediately previously received packet to determine if the elapsed time $\Delta t$ is at least equal to a time lapse indicating that at least one packet is missing between the currently received packet and the immediately previously received packet; processing the elapsed time $\Delta t$ indicating that at least one packet is missing to determine a number of missing packets between the immediately previously received packet and the currently received packet; adding the number of missing packets to a packet number of the immediately previously received packet to update a number of the current packet in a sequence of transmission of the plurality of packets; and decompressing the compressed header of the current packet using the updated number of the current packet. The header of the current packet may be a second order compressed header. A number of packets missing between the immediately previously received packet and the currently received packet may be calculated as $i*SEQ\_CYCLE+DIFFk(n_2, n_1)$ if $(DIFF(n_2, n_1)+i*SEQ\_CYCLE)*$ (t time units)$\leq \Delta t < DIFF(n_2, n_1)$, +

$(i+1)*SEQ\text{-}CYCLE*$(t time units)

wherein i is a whole number equal to or greater than zero, $n_2$ is a sequence number in a sequence of transmission of the packets including the current packet, $n_1$ is a sequence number in the sequence of transmission of the packets including the immediately previously received packet, SEQ\_CYCLE is equal to $2^k$ wherein k is the number of bits of the sequence number, $DIFF(n_2, n_1)$ is the difference in packet number between in the current and immediately previously received packets and $DIFF(n_2, n_1)=n_2-n_1$ when $n_2>n_1$ and $DIFF(n_2, n_1)=n_2+2^k-n_1$ when $n_2 \leq n_1$.

A system in accordance with the invention includes a transmitter transmitting a plurality of packets each containing a header; and a receiver which receives the transmitted plurality of packets; and wherein the receiver comprises a counter which determines elapsed time $\Delta t$ between consecutively received packets, and compares the elapsed time $\Delta t$ between the currently received packet and an immediately previously received packet to determine if the elapsed time $\Delta t$ is at least equal to a time lapse indicating that at least one packet is missing between the currently received packet and the immediately previously received packet, processes the elapsed time $\Delta t$ indicating that at least one packet is missing to determine a number of missing packets between the immediately previously received packet and the currently received packet, adds the number of missing packets to a packet number of the immediately previously received packet to update a number of the current packet in a sequence of transmission the plurality of packets, and decompresses the compressed header of the current packet using the updated number of the current packet. The header of the current packet may be a second order compressed header. A number of packets missing between the immediately previously received packet and the currently received packet may be calculated as $i*SEQ\_CYCLE+DIFF(n_2, n_1)$ if $(DIFF(n_2, n_1)+i*SEQ\_CYCLE)*$ (t time units)$\leq \Delta t<(DIFF(n_2, n_1)$, +

$(i+1)*SEQ\_CYCLE*$(t time units)

wherein i is a whole number equal to or greater than zero, $n_2$ is a sequence number in a sequence of transmission of the packets including the current packet, $n_1$ is a sequence number in the sequence of transmission of the packets including the immediately previously received packet, SEQ\_CYCLE is equal to $2^k$ wherein k is the number of bits of the sequence number, DIFF($n_2$, $n_1$) is the difference in packet number between in the current and immediately previously received packets and DIFF($n_2$, $n_1$)=$n_2$−$n_1$ when $n_2$>$n_1$ and DIFF($n_2$, $n_1$)=$n_2$+$2^k$−$n_1$ when $n_2 \leq n_1$.

In a system having a transmitter transmitting a plurality of packets each containing a header to a receiver, a method of synchronizing transmission of first order compressed headers between the transmitter and receiver in accordance with the invention includes transmitting a current packet to the receiver containing a first order compressed header with a number of the current packet in the plurality of packets being coded by an extended sequence number having l bits; in response to reception of the current packet containing the first order compressed header, transmitting from the receiver to the transmitter an acknowledgment packet that the receiver has received the current packet containing the first order compressed header; and in response to reception of the acknowledgment packet, the transmitter transmits subsequent packets each containing a sequence number having a non-extended sequence number having k bits with l>k. The transmitter may store the header of the current packet, which has been acknowledged as being received by the receiver, as a reference header that is used in the transmission of the subsequently transmitted packets containing a first order compressed header as a reference header to be used by the receiver to decompress the subsequent headers; the receiver may store the header of the current packet, which is acknowledged as a reference header, for decompressing the compressed headers of the subsequently transmitted packets containing a first order compressed header, the transmitter may transmit subsequent packets containing the first order compressed header using the stored header of the current packet as a reference header, and the receiver may decompress the compressed headers of the subsequently transmitted received packets containing the first order compressed header with the stored reference header to produce a full header which is not compressed. The receiver may detect at least one lost packet in the subsequently transmitted packets by comparison of the sequence numbers of successively received transmitted packets.

In a system having a transmitter transmitting a plurality of packets each containing a header to a receiver, a method of synchronizing transmission of first order compressed headers between the transmitter and receiver in accordance with the invention includes transmitting a plurality of packets to the receiver each containing a first order compressed header with a number of each of the plurality of packets in an order of transmission being defined by a sequence number having l extended bits; and detecting at least one lost packet in the transmitted plurality of packets between a current packet and a last packet when a difference DIFF equals a difference between (CD_SN_CURR and CD_SN_LAST) wherein CD_SN LAST is an absolute packet number of a last received packet and CD_SN_CURR is an absolute sequence number of the current packet wherein the absolute packet number is a counter maintained by the transmitter and receiver having J bits wherein J≧than l extended bits. A number of lost packets $N_{loss}$ may be calculated to be equal to the difference between (CD_SN_CURR and CD_SN_LAST).

A system in accordance with the invention includes a transmitter which transmits a plurality of packets each containing a header; and a receiver which receives the plurality of packets each containing a header; and wherein a current packet is transmitted by the transmitter to the receiver containing a first order compression header with a number of the plurality of packets being coded by an extended sequence number having l bits, in response to reception of the current packet containing the first order header the receiver transmits to the transmitter an acknowledgment packet that the receiver has received the current packet containing the first order compressed header and the transmitter in response to reception of the acknowledgment packet transmits subsequent packets each containing a sequence number in the plurality of packets having k bits wherein l>k. The transmitter may store the header of the current packet, which has been acknowledged as being received by the receiver, as a reference header that is used in the transmission of the subsequently transmitted packets containing a first order compressed header as a reference header to be used by the receiver to decompress the subsequent headers; the receiver may store the header of the current packet, which is acknowledged as a reference header, for decompressing the compressed headers of the subsequently transmitted packets containing a first order compressed header; the transmitter may transmit subsequent packets containing the first order compressed header using the stored header of the current packet as a reference header; and the receiver may decompress the compressed headers of the subsequently transmitted received packets containing the first order compressed header with the stored reference header to produce a full header which is not compressed. The receiver may detect at least one lost packet in the subsequently transmitted packets by comparison of the sequence numbers of successively received transmitted packets.

In a system having a transmitter transmitting a plurality of packets each containing a header to a receiver, a method of synchronizing the transmission of headers between the transmitter and receiver in accordance with the invention includes transmitting from the receiver to the transmitter periodic acknowledgments which are individually transmitted to the transmitter with a spacing such that the transmitter receives an acknowledgment at least once every N packets where N=$2^k$ and k is a number of bits used to number the packets in sequence; and in an absence of the transmitter receiving a properly timed acknowledgment from the receiver, the receiver increases the number of bits defining the sequence number to be l extended bits. The receiver may detect a maximum number of lost packets equal $2^l$ extended bits. The transmitter, in response to a subsequently received acknowledgment, may reduce the number of bits in the sequence numbers containing l_extended bits to k bits.

In a system having a transmitter which transmits a plurality of packets to a receiver, each of the packets containing a header, a method of maintaining sequence synchronization during transmission of packets having compressed headers between the transmitter and the receiver in accordance with the invention includes initiating transmission of packets having compressed headers by transmitting from the transmitter to the receiver a packet having a full header; transmitting from the transmitter to the receiver, subsequent to transmission of the packet having the full header, packets having compressed headers, each compressed header containing information related to the packet having a full header; and periodically transmitting from the receiver to the transmitter an acknowledgment packet indicating that the packets having the compressed headers have been received. The transmitter may sequentially add to the compressed header of each of the packets having compressed headers a sequence number which is incremented by one for each sequential packet of the packets having compressed headers, the sequence number having a predetermined number of bits. When the transmitter has not received the acknowledgment packet, the number of bits of the sequence number may be increased beyond the predetermined number of bits.

A method of reducing a number of bits contained in headers of a sequence of transmitted data packets in accordance with the invention includes transmitting at least one sequence of data packets from a transmitter to a receiver with each sequence containing at least one packet containing a full header followed by at least one packet containing a compressed header having fewer bits than the full header; in response to one of the data packets received by the receiver containing a full header transmitting from the receiver to the transmitter an acknowledgment that the receiver has received the one data packet containing the full header; and in response to the receiving of the acknowledgment by the transmitter, transmitting at least one subsequent data packet from the transmitter to the receiver with a header which is further compressed beyond the compression of the at least one header in the at least one sequence. The compressed headers of the at least one sequence may be first order compressed headers; and the compressed header of the at least one subsequent packet may be a second order compressed header. A plurality of sequences of packets may be transmitted.

The receiver generates the acknowledgment in response to a first received packet containing a full header. The receiver may transmit at least one additional acknowledgment to the transmitter in response to reception of the at least one packet containing a compressed header. The at least one additional acknowledgment may be generated in response to a first packet in the at least one sequence.

A method of reducing a number of bits contained in headers of a sequence of transmitted packets in accordance with the invention includes transmitting at least one sequence of packets from a transmitter to a receiver with each sequence containing at least one packet containing a first header followed by at least one packet containing a second header which is compressed by having fewer bits than the first header; in response to one of the packets received by the receiver containing the first header transmitting from the receiver to the transmitter an acknowledgment that the receiver has received the one packet containing the first header; and in response to the receiving of the acknowledgment by the transmitter, transmitting at least one subsequent packet from the transmitter to the receiver with a third header which is further compressed beyond the compression of the second compressed header. The second compressed header may be a first order compressed header; and the third header may be a second order compressed header. A plurality of sequences of packets may be transmitted. The receiver may generate the acknowledgment in response to a first received packet containing the first header. The receiver may transmit at least one additional acknowledgment to the transmitter in response to reception of the at least one packet containing a compressed header. The at least one additional acknowledgment may be generated in response to a first packet in the at least one sequence.

A method of reducing a number of bits contained in headers of a sequence of transmitted packets in accordance with the invention includes transmitting at least one sequence of packets from a transmitter to a receiver with each sequence containing at least one packet containing a full header followed by at least one packet containing a compressed header having fewer bits than the full header; and in response to one of the packets received by the receiver containing a full header transmitting from the receiver to the transmitter an acknowledgment that the receiver has received the one packet containing the full header.

A method of reducing a number of bits contained in headers of a sequence of transmitted packets in accordance with the invention includes transmitting at least one sequence of packets from a transmitter to a receiver with each sequence containing at least one packet containing a first header followed by at least one packet containing a second header which is compressed by having fewer bits than the first header; and in response to one of the packets received by the receiver containing the first header transmitting from the receiver to the transmitter an acknowledgment that the receiver has received the one packet containing the first header.

A method of transmitting packets within a string of packets having compressed headers each containing a sequence number identifying a position of each packet in the string from a transmitter to a receiver in accordance with the invention processing the string to detect when the string contains at least one lost or out of sequence packet prior to transmission of the packet; transmitting the string with compressed headers from the transmitter to the receiver as a sequence of packets containing packets preceding and succeeding the lost or out of sequence packets; and transmitting with at least one packet succeeding the at least one lost or out of sequence packet a number of any lost or out of sequence packets in the data string of packets. The receiver may decompress at least one succeeding packet which is received including adding the number of any lost or out of sequence packets to the sequence number of each received succeeding packet. The decompressing by the receiver may use a stored reference packet which was transmitted as part of the string of packets before the at least one sequence and includes a sequence number used to decompress the at least one subsequent packet. The string may contain at least one lost packet or at least one out of sequence packet.

A method of transmitting packets within a string of packets having compressed headers each containing a sequence number identifying a position of each packet in the string from a transmitter to a receiver in accordance with the invention includes processing the string to detect when the data string contains at least one lost packet prior to transmission of the packet, transmitting the string with compressed headers from the transmitter to the receiver as a sequence of packets containing packets preceding and succeeding the lost packets; and transmitting with at least one packet succeeding the at least one lost packet a number of any lost packets. The receiver may decompress at least one succeeding packet which is received including adding the number of any lost packets to the sequence number of each received succeeding packet. The decompressing by the receiver may use a stored reference packet which was transmitted as part of the string of packets before the at least one sequence and includes a sequence number used to decompress the at least one subsequent packet.

A method of transmitting packets within a data string of packets having compressed headers each containing a sequence number identifying a position of each packet in the string from a transmitter to a receiver in accordance with the invention may include processing the string to detect when the string contains at least one lost or out of sequence packet prior to transmission of the packet; transmitting the string with compressed headers from the transmitter to the receiver as a sequence of packets containing packets preceding and succeeding the lost or out of sequence packets; and transmitting with at least one packet succeeding the at least one out of sequence packet a number of any out of sequence packets in the data string. The receiver may decompress at least one succeeding packet which is received including adding the number of any out of sequence packets to the sequence number of each received succeeding packet. The decompressing by the receiver may use a stored reference packet which was transmitted as part of the string of packets before the at least one sequence and includes a sequence number used to decompress the at least one subsequent packet.

A method of transmitting a string of packets in accordance with the invention includes processing the string of packets with an error detection process to identify any packets in the string of packets which contain errors; removing the packets from the string which contain the detected errors; and transmitting from a transmitter to a receiver the string without the packets which have been removed. The error detection process may utilize a checksum within each packet to identify any packets in the string of packets which contain errors. The error detection process may process data in each packet to compute an error correction code and determine if a stored error correction code in each packet matches the computed error correction code and if a match is not found the packet is removed from the string. Headers of at least some of the packets are compressed prior to transmission. The compression of headers of at least some of the packets may occur after the removal of packets containing errors. The transmission of the string may be over a limited bandwidth transmission medium with the removal of any packets containing an error reducing use of the limited bandwidth during the transmission.

A method of decompressing headers of a transmitted string of packets which individually contain a sequence number identifying a position of each transmitted packet in the string of packets prior to transmission in accordance with the invention includes transmitting the string of packets from a transmitter to a receiver with at least one received sequential packet in the transmitted string of packets not being in the received string of packets; processing the sequence numbers of the received packets to determine a number of sequential packets of the transmitted string of packets which are not present in the received packets; and decompressing the header of at least one received packet succeeding the at least one packet not present in the received packets by using the number of sequential packets which are determined to not have been received. The decompressing of the header of at least one received packet succeeding the at least one packet not present in the received packets may be performed by adding a product of the number and an extrapolation function to the header of a received packet which preceded the at least one received packet not present in the received packets. A plurality of transmitted packets may not be present in the received packets. At least one compressed header in the at least one received packet succeeding the at least one packet which is not present in the received packets may be decompressed by adding a plurality of products of the number and different extrapolation functions to the at least one compressed header in the at least one packet succeeding the at least one packet which is not present in the received packets. The extrapolation function may vary linearly from packet to packet in a plurality of packets succeeding the at least one packet which is not present in the received packets. The extrapolation function may vary non-linearly within a plurality of packets succeeding the at least one packet which is not present in the received packets. The extrapolation function may be a time stamp of the at least one received packet succeeding the at least one packet which is not present in the received packets. The extrapolation function may represent the sequence number of the at least one received packet succeeding the at least one packet which is not present in the received packets. The extrapolation function may be an IP ID. The extrapolation function may represent the sequence number of the at least one received packet succeeding the at least one packet which is not present in the received packets. The compressed headers may be second order compressed headers.

A method of regenerating headers of compressed packets within a string of packets which individually contain a sequence number identifying a position of each transmitted packet in the string of packets in accordance with the invention includes transmitting the string of packets from a transmitter to a receiver with at least one received packet in a sequence within the transmitted string being received with an erroneous compressed header; storing the at least one received packet in at least one sequence which is erroneous; determining a number of packets in each stored sequence; and when a number of stored packets in at least one sequence matches a number determined by processing the sequence numbers of the packets preceding and succeeding the at least one sequence, regenerating the compressed headers of at least one stored sequence by adding a function of an extrapolation function to a header of at least one packet of at least one sequence. The function of an extrapolation function which may be added to a header of a plurality of packets of the at least one sequence increases linearly between sequential packets in the at least one sequence. A function of a plurality of different extrapolation functions may be added to a header of at least one packet of at least one sequence. The function of the plurality of different extrapolation functions which is added to a header of a plurality of packets of at least one sequence may increase linearly between sequential packets in the at least one sequence. The number of packets in each stored sequence may be determined from a difference between the sequence number of the packets immediately preceding and immediately succeeding the at least one sequence. The extrapolation function may be a time stamp. The extrapolation function may be a sequence number. The extrapolation function may be an IP ID. The extrapolation functions may be a time stamp, a sequence number, or IP ID. Each header of the at least one packet may be a first order header; and each header of the at least one additional packet is a second order header. The feedback may be an acknowledgment packet.

A method of transmitting headers from a compressor to a decompressor in accordance with the invention includes transmitting a plurality of packets from a compressor to a decompressor; in response to receiving the at least one packet at the decompressor, transmitting at least one feedback to the compressor signalling that the decompressor has received at least one of the plurality of packets; and transmitting at least one additional packet from the compressor to the decompressor which has a smaller number of bits in a header of the at least one additional packet than a number of bits of a header in the at least one packet when whichever first occurs of (1) a transmission of a predetermined number of packets of the at least one packet, or (2) reception of the at least one feedback. Each header of the at least one packet may be a full header; and each header of the at least one additional packet may be a first order header. Each header of the at least one packet may be a first order header; and each header of the at least one additional packet may be a second order header. The feedback may be an acknowledgment packet. The predetermined number of packets may be based upon a selection criteria.

A method of transmitting headers from a compressor to a decompressor in accordance with the invention includes transmitting a plurality of packets from a compressor to a decompressor; and transmitting at least one additional packet from the compressor to the decompressor which has a smaller number of bits in a header of the at least one additional packet than a number of bits of a header in the at least one packet when a transmission of a predetermined number of packets of the at least one packet has occurred. The predetermined number of packets may be based upon a selection criteria. The selection criteria may be based upon channel conditions involving transmissions to the decompressor from the compressor or transmissions from the decompressor to compressor. The selection criteria may be based upon channel conditions involving transmissions to the decompressor from the compressor or transmissions from the decompressor to compressor.

In a system having a transmitter which transmits a plurality of packets to a receiver, each of the packets containing a header, a method of maintaining sequence synchronization during transmission of packets having compressed headers between the transmitter and the receiver in accordance with the invention includes initiating transmission of packets having headers by transmitting from the transmitter to the receiver a packet having a header; transmitting from the transmitter to the receiver, subsequent to transmission of the packet having the header, packets having compressed headers, each compressed header containing information related to the header of the packet; and nonperiodically transmitting from the receiver to the transmitter an acknowledgment packet indicating that the packets having the compressed headers have been received.

BRIEF DESCRIPTION OF THE DRAWINGS

FIG. 6 illustrates the transition of a compressor from transmitting headers having a higher number of bits to headers having a lower number of bits using acknowledgments in accordance with the present invention.

FIGS. 14A–F illustrate formats of packets which are transmitted by the present invention.

FIG. 16 illustrates the switching of a state of compression of a compressor to a higher state of compression before a present number of packets arrives at a decompression when an acknowledgment is received.

FIG. 17 illustrates the switching of a state of compression of a compressor to a higher state of compression after a preset number of packets arrives at a decompressor before an acknowledgment arrives.

FIG. 18 illustrates the switching of a state of compression of a compressor to a higher state of compression only after a present number of packets arrives at a decompression.

DESCRIPTION OF THE PREFERRED EMBODIMENTS

Figure 2:
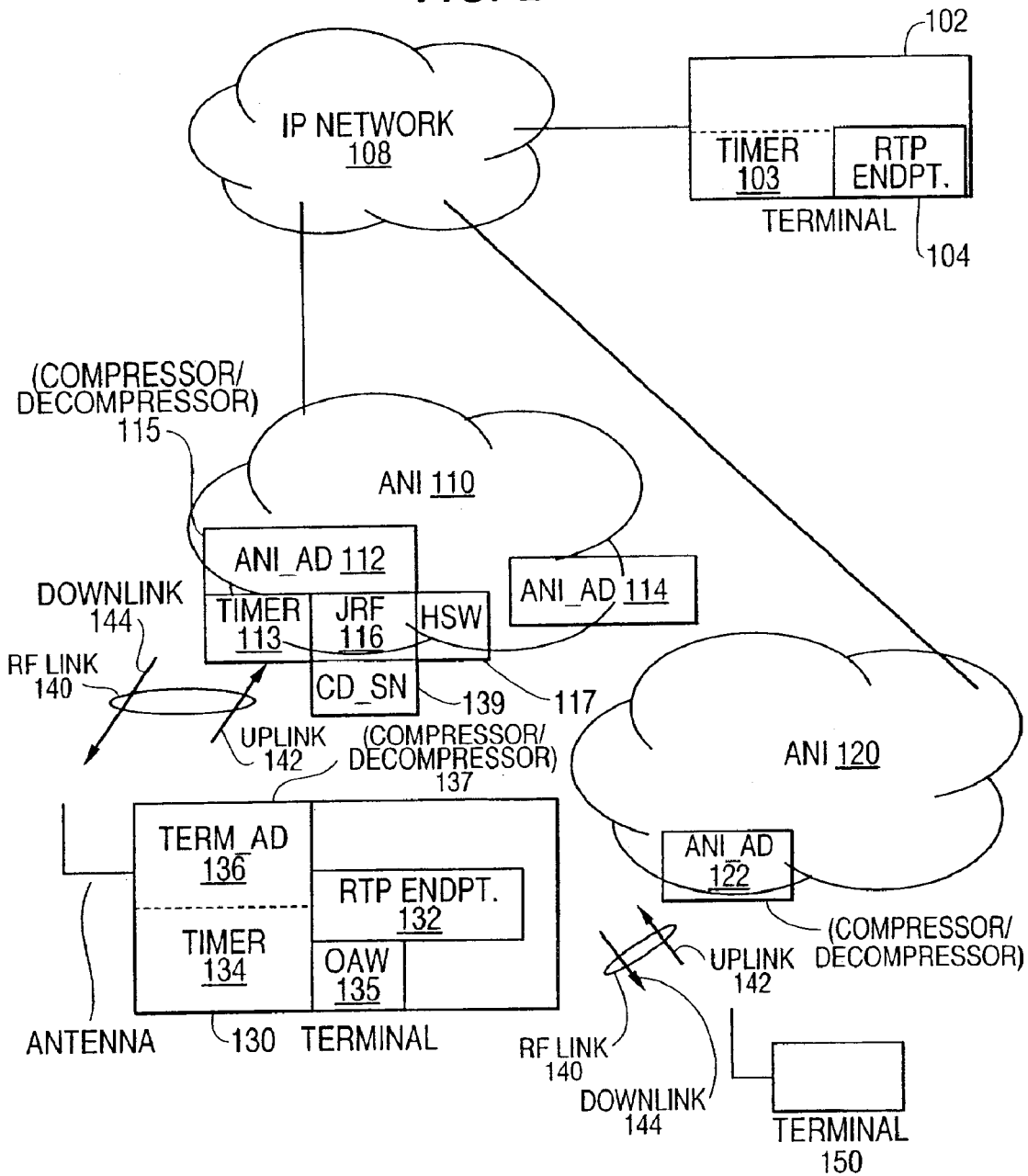
FIG. 2 illustrates an example of a system architecture which may be used to practice the present invention.

FIG. 2 illustrates an exemplary system in which the various embodiments of the present invention may be practiced. However, it should be understood that the present invention is not limited thereto with other system architectures being equally applicable to the practice of the invention. A terminal 102 is connected to a IP network 108. Terminal 102 may be, without limitation, a personal computer or the like running RTP/UDP/IP, and providing packetized voice samples in RTP packets for transmission over IP network 108. Terminal 102 includes a RTP endpoint 104 which identifies this terminal (e.g., including IP address, port number, etc.) as either a source and/or destination for RTP packets. While IP network 108 is provided as an example of a packet network, however, other types of packet switched networks or the like can be used in place thereof. Terminal 102 also includes a local timer 103 for generating a time stamp.

Access network infrastructures (ANI) 110 and 120, which may be resident in a base station subsystem (BSS), are connected to IP network 108. The ANI's are network entities and network nodes. A plurality of wireless mobile terminals which are network entities and network nodes and function as mobile compressors and mobile decompressors (two wireless terminals 130 and 150 are illustrated) are coupled via radio frequency (RF) links 140 to ANIs 110 and 120. When one of the mobile terminals 130 and/or 150 move, it is necessary for the terminal(s) from time to time, as a consequence of movement beyond radio connection with one ANI, to be handed off to another ANI. This process also requires, when header compression and decompression is used and located in the ANI, the transfer of compression and decompression context information from one ANI (old) to another ANI (new) to achieve seamlessness, e.g. if mobile terminals 130 and/or 150 move and are handed off from ANI 110 to ANI 120. The transfer, as discussed below, can happen at various times but to minimize disruption, it should be completed by the time the new ANI takes over the header compression/decompression role from the old ANI. The relocation of compression/decompression functions occur when the new network entity takes over at a point in time. On the other hand, the transfer of context information may be spread over a time material and precedes relocation. RF link 140 includes, as illustrated, an uplink traffic 142 (from mobile terminals 130 and 150 to ANI 110) and downlink traffic 144 (from ANI 110 to mobile terminals 130 and 150). The mobile terminals 130 and/or 150 are handed off from one ANI, such as ANI 110 when one or more of the mobile terminals move to another ANI, e.g. ANI 120. Each ANI interfaces with one or more of the wireless (or radio frequency) terminals (including terminal 130) in a region to IP network 108, including converting between wireline signals (provided from IP network 108) and wireless or RF signals (provided to or from terminals 130 and 150). Thus, each ANI allows packets, such as, but not limited to, RTP packets transmitted and received from IP network 108 to be sent over RF link 140 to at least one of wireless terminals 130 and 150, and allows transmission of packets, such as RTP packets but not limited to RTP packets, to be transmitted from terminals 130 and 150 to be transmitted by IP network 108 to another terminal, such as terminal 102.

Each ANI includes a plurality of entities. The more detailed depiction and explanation of ANI 110 is given to facilitate understanding of the architecture and operation of all of the ANI's in the network. All ANI's may be of the same architecture as ANI 110 but are not illustrated in the same degree of detail. ANI 110 includes one or more ANI adapters (ANI_AD), such as ANI_AD 112 (illustrated in detail) and ANI_AD 114, each of which preferably includes a timer 113 to provide a time stamp. Each ANI_AD performs header compression (prior to downlink traffic) and decompression (after uplink traffic). Headers (one or more header fields, such as a time stamp and sequence number) for RTP packets received from IP network 108 are compressed by ANI_AD 112 prior to transmission to terminals 130 and 150 over downlink traffic 142, and packet headers received from mobile terminals 130 and 150 are decompressed by ANI_AD 112 before transmission to IP network 108. ANI_AD 110 functions as a transmitter/receiver (transceiver) and specifically as a compressor/decompressor 115 with the compressor compressing data packets prior to transmission and the decompressor decompressing data packets after reception. ANI_AD 110 interfaces with terminals located in a specific or different area within the region to IP network 108. ANI_AD 112 includes a timer 113 for implementing a timer-based decompression technique. ANI_AD 112 also includes a jitter reduction function (JRF) 116 which operates to measure the jitter on packets (or headers) received over the network 108 and discard any packets/headers which have excessive jitter.

Each terminal includes a plurality of entities. The more detailed explanation of the mobile terminal 130 is given to facilitate understanding of the design and operation of all mobile terminals 130 and 150 in the network which are of a similar design and operation. Each of the mobile terminals may also function as a compressor/decompressor in communications beyond ANI's 110 and 120 and specifically, with other networks. Mobile terminal 130 includes an RTP endpoint 132 which is a source (transmitter) and/or destination (receiver) for RTP packets and identifies the terminal's IP address, port number, etc. Mobile terminal 130 includes a terminal adapter (MS_AD) 136 which performs header compression (packets to be transmitted over uplink traffic 142) and decompression (packets received over downlink traffic 144). Thus, terminal adapter (MS_AD) 136 may be considered to be a header compressor/decompressor (transceiver) 137, similar to the ANI_AD compressor/decompressor. The terminology MS_AD has the same meaning as AD.

The MS_AD 136 also includes a timer 134 (a receiver timer) for calculating an approximation (or estimate) of a RTP time stamp of a current header and to measure elapsed time between successively received packets to locate loss of packets during transmission to the terminal by wireless degradation such as fading. The MS_AD 136 may use additional information in the RTP header to refine or correct the time stamp approximation as described in copending patent application Ser. No. 09/377,913, filed on Aug. 20, 1999, and assigned to the same assignee, which application is incorporated herein by reference in its entirety. The time stamp approximation may be corrected or adjusted based upon a compressed time stamp provided in the RTP header. In this manner, a local timer and a compressed time stamp may be used to regenerate the correct time stamp for each RTP header.

RTP packets, including packets with compressed and uncompressed headers, are transmitted in the network such as, but not limited to, the exemplary network of FIG. 2 over a data link (such as wireless link 140) where bandwidth is at a premium and errors are not uncommon. The present invention is not limited to a wireless link, but is applicable to a wide variety of links (including wireline links, etc.).

Figure 3:
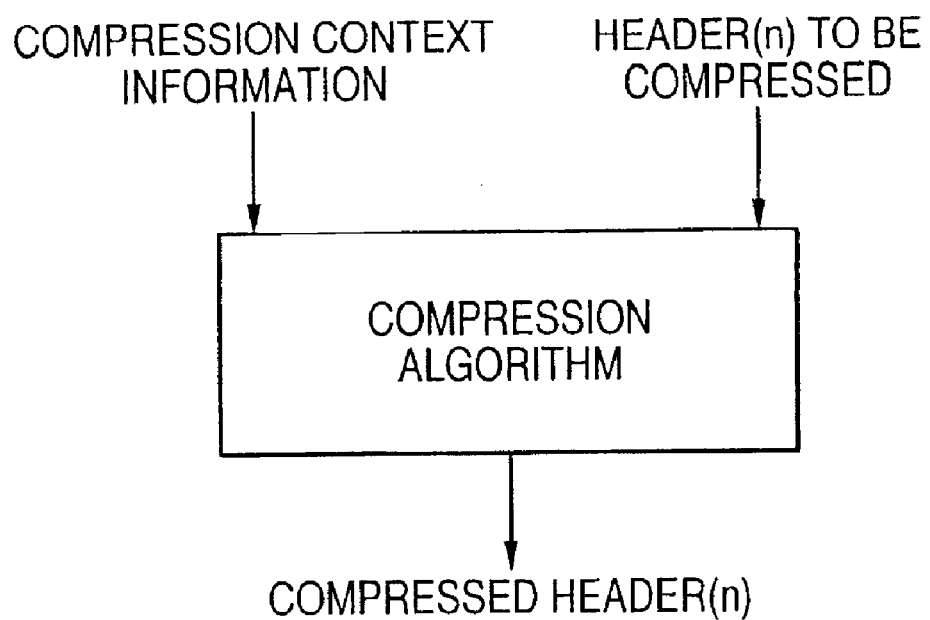
FIG. 3 conceptually illustrates compression context information.

FIG. 3 illustrates conceptually compression context information and examples. Compression context information is a set, subset or representation of a subset of information which may be of any type in a header used by the compressor as an input to the compression algorithm to produce a compressed header and may be transmitted from one entity to another entity. The other input is from the header source of the headers to be compressed.

Figure 4:
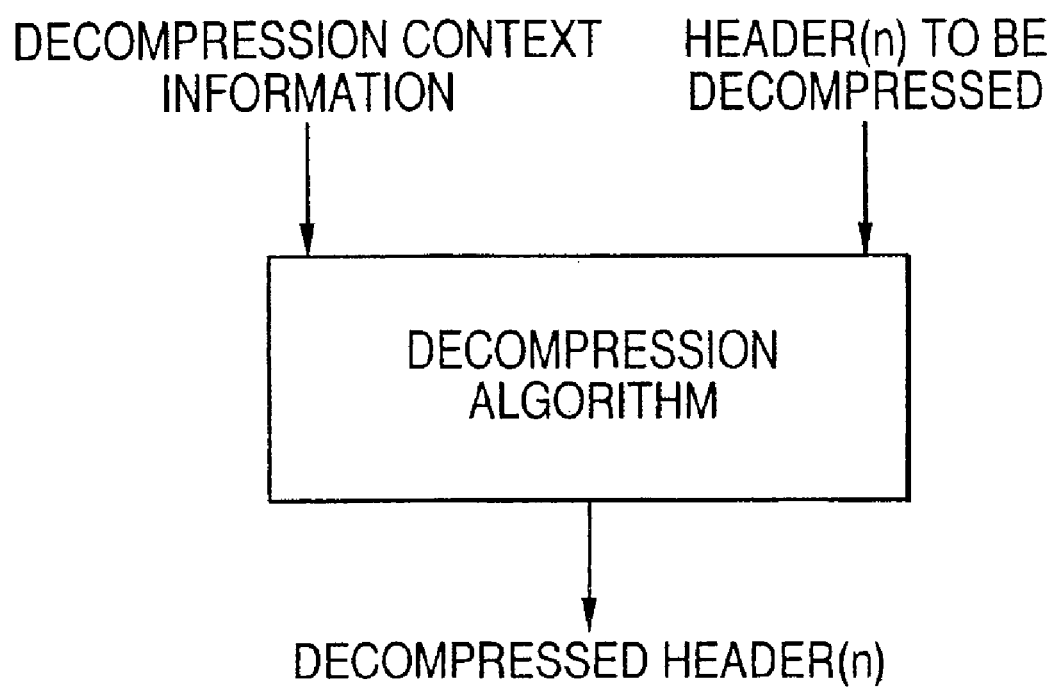
FIG. 4 conceptually illustrates decompression context information.

FIG. 4 illustrates conceptually decompression context information and examples. Decompression context information is a set, subset or representation of a subset of information which may be of any type in a header used by the decompression as an input to the decompression algorithm to produce a decompressed header and may be transmitted from one entity to another entity. The other input is from the header source of the headers to be decompressed.

Both the compression and decompression context informations are dynamic, that is, they may be updated by the compressor and decompressor respectively. The frequency of updates depends on the header compression scheme. Events that may result in an update of the compression context information at the compressor include the compression of an incoming header, or the receipt of feedback from the decompressor. Events that may result in an update of the decompression context information at the decompressor include the decompression of an incoming header.

Adaptive Header Compression (ACE) is a general framework for robust header compression that can be parameterized to account for the existence/non-existence and performance characteristics of a feedback channel. The framework includes three basic modes of operation:

Bidirectional Deterministic Mode: This mode is used in the case where there is a 'well-defined' reverse channel, which can be used to carry various types of feedback information from the decompressor to the compressor. One example of such feedback from the decompressor is the ACKnowledgement, used, e.g., to advance from a lower compression state to a higher compressor state.

By reception of ACKs via a well-defined channel, the compressor obtains the knowledge that some specific header has been received. The compressor takes advantage of that knowledge to compress more reliably and more efficiently.

Bidirectional Opportunistic Mode: This mode of operation is used in the case where a reverse channel exists, but is 'loosely' defined, i.e., the channel may not always be available, or may be slow/unreliable. There are many important applications that are 2-way bi-directional. A primary example is conversational voice or video. In such cases, there is inherently a reverse channel, which can carry the feedback.

Unidirectional Mode (Pessimistic or Optimistic): This mode of operation is used when there is no reverse channel of any kind. Because there is no feedback at all from the decompressor regarding its current state, the compressor must occasionally send some refreshment information to the decompressor, which can be used to re-establish synchronism in the event that something has gone wrong. Depending on various factors (e.g., channel conditions), that may be known to the compressor, the approach in this mode could be either pessimistic (more frequent refreshes) or optimistic (less frequent refreshes). In addition, there are events that can trigger the compressor to send FH information, to refresh the decompressor and reduce the chance of incorrect decompression.

The ACE compressor can be characterized as progressing through a series of states. The compressor leaves a lower compression state and enters a higher compression state when it has sufficient confidence that the decompressor has received some information.

In the case of RTP header compression, the states are Full Header, First Order, and Second Order states.

Full Header (FH) State: The compressor enters this state when at initialization time or when some exceptional event (CPU crash or memory loss) occurs. In this state, the compressor essentially transmits FH header information to the decompressor. An FH header contains the complete set of all header fields, plus some additional information. This information can include compressor/decompressor specific data, such as the CID (Context Identifier, used to discriminate multiple flows). The compressor stays in this state until it has acquired sufficient confidence that the decompressor has received the FH header information. FH packets are the least optimal to transmit due to their large size (e.g., at least 40 bytes for IPv4, 60 bytes for IPv6). The compressor leaves this state and enters the FO state when it has sufficient confidence that the decompressor has correctly received an FH header. That confidence could come, e.g., from receipt of an ACK from the decompressor or sending a predefined number of FHs.

First Order (FO) State: The compressor enters this state when a new string starts, after it has left the FH state. In this state, the compressor essentially transmits FO header information. An FO header contains compressor/decompressor specific fields, and some information that describes irregular changes that have occurred in the essential changing fields. The compressor stays in this state until it has acquired sufficient confidence that the FO header information has been received by the decompressor. That confidence could come, e.g., from receipt of Acknowledgments from the decompressor or sending a predefined number of FOs.

Second Order (SO) State: The compressor is in this state when the header to be compressed conforms to the pattern of a string, and the compressor is sufficiently confident that the decompressor has acquired the string pattern. In this state, the compressor transmits SO headers. An SO header contains essentially just a sequence number. The preferred mode of operation for the compressor/decompressor is transmission/reception of SO packets, due to their minimal size (on the order of just a few bits).

In summary, a session starts with the compressor in the FH state. In that phase, the compressor sends a full header to the decompressor to establish a context in the decompressor. This initiates a string. The compressor then enters the FO, or SO states. In the FO state, it sends the necessary essential changing field update information to the decompressor. In the SO state, it sends minimal information to the decompressor. The decompressor does a simple extrapolation based on information exchanged in the previous FH and FO packets until the string ends. When another string starts, the compressor enters the FO state again, and the process repeats.

Bi-directional transmission modes utilize acknowledgments for various functions:

to inform the compressor that FH information has been received; in that case, the compressor knows that the decompressor has acquired the information necessary to decompress FO headers and therefore the compressor can reliably transition to the higher compression state, FO; this kind of ACK is referred to as FH-ACK to inform the compressor that FO information has been received; in that case, the compressor knows that the decompressor has acquired the information necessary to decompress SO headers and therefore the compressor can reliably transition to the higher compression state, SO; this kind of ACK is referred to as FO-ACK to inform the compressor that a header with a specific number n has been received; in that case, the compressor knows that the decompressor can determine the sequence number without any ambiguity caused by counter wrap around up to header number n+seq__cycle, where seq__cycle is the counter cycle; the compressor can reliably use k bits for the header sequence number, without concerns of ambiguous or incorrect sequence number decoding at the decompressor; this kind of ACK is referred to as SO-ACK The control of transition from FH to FO to SO states by Acknowledgments ensure that there is no error propagation. That is, a compressed header that is not received in error can always be correctly decompressed, because synchronization is never lost.

There is a lot of flexibility with respect to when and how often the decompressor sends the acknowledgments. ACE is also extremely resilient to ACKs being lost or delayed. The compressor constantly adapts its compression strategy based on the current information to be compressed and the ACKs received. For example, loss or delay of an FO-ACK may result in the compressor staying longer in the FO state. Loss or delay of an SO-ACK may result in the compressor sending more bits for the sequence number, to prevent any incorrect decompression at the decompressor caused by counter wrap around.

ACKs can be transmitted periodically or non-periodically. The frequency of non-periodic acknowledgments may be decreased or increased from a periodic rate. An ACK can be sent less frequently because ACKs are lost due to errors or network congestion, or ACKs cannot be transmitted due to the intermittent available of the reverse channel or some decompressor conditions. An ACK can also be transmitted more closely spaced than traditional periodic ACK. For example, when the reverse channel is very lightly loaded and available, the decompressor can transmit ACKs more often and as a result the compressor can operate more efficiently and reliably.

Consequently, the feedback channel utilized to transmit the ACKs can have very loose requirements. This is because ACKs only have an effect on the compression efficiency, not the correctness. Delay or loss of ACKs may cause the size of compressed headers to increase, but even in such cases the increase is logarithmic.

In the bi-directional deterministic mode, the transition from FH/FO to FO/SO is acknowledgment based. In the unidirectional mode, an ACK is never sent, so the number of FH/FO packets which are sent before transition to FO/SO state depends on a predefined or a dynamically/adaptively selected value. In the bi-directional opportunistic mode, the ACK may be late, so the transition from FH/FO to FO/SO is not strictly ACK-based, but depends on whichever comes first of 1) transmission of a predefined or dynamically/adaptively selected number of FH/FO, or 2) reception of at least one ACK.

In summary, the number of FO/FH packets to sent before switching to FO/SO state depends on whether an ACK is required before switching and/or a tunable parameter m that may be predefined or dynamically/adaptively selected. Four cases are discussed below.

Figure 15:
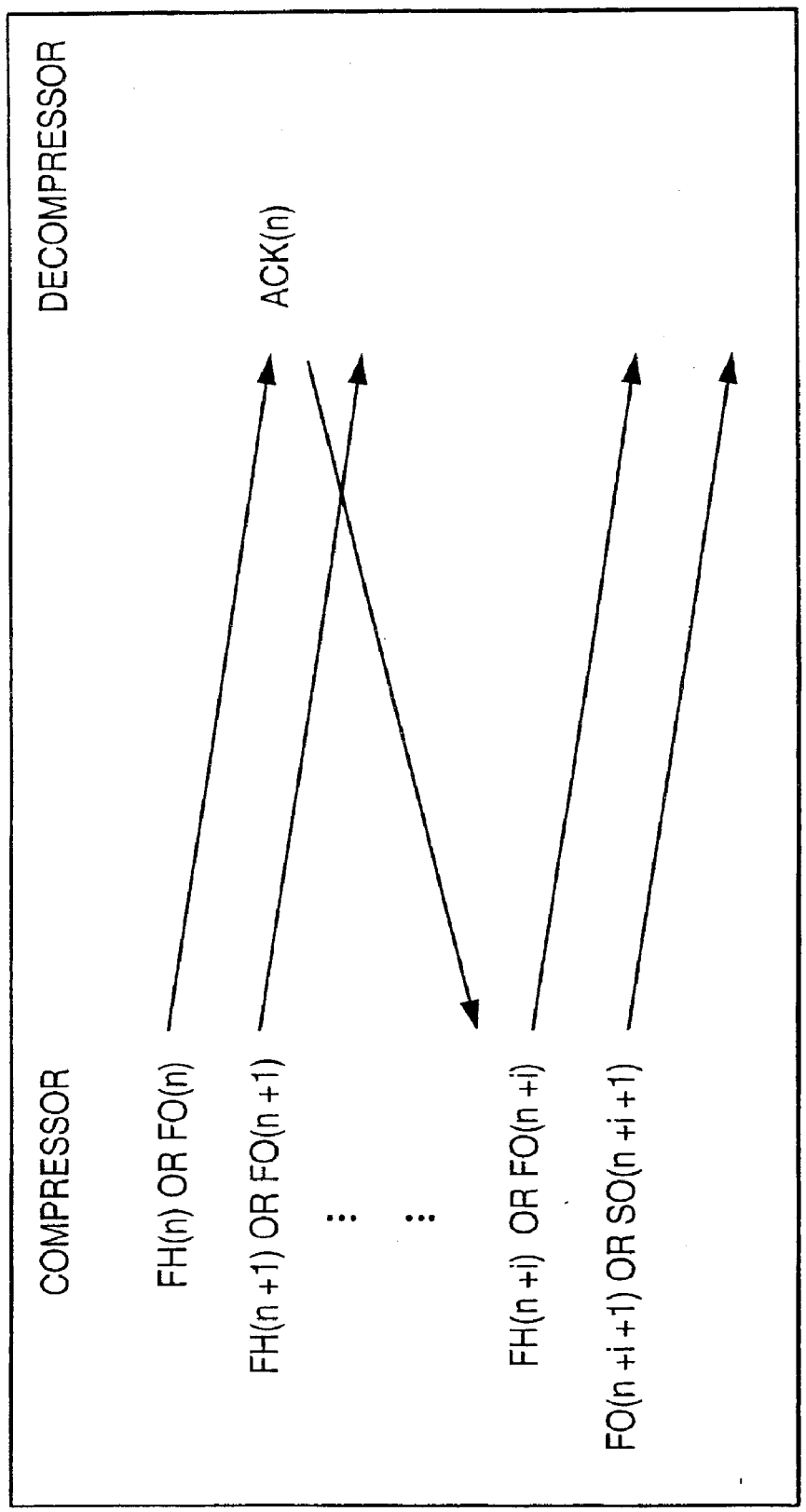
FIG. 15 illustrates the switching of a state of compression of a compressor to a higher state of compression only after an acknowledgment is received from a decompressor in accordance with the invention.

FIG. 15 illustrates switching of the state of compression of the compressor based only on arrival of an appropriate ACK. A sequence of at least one header of a particular state which, as illustrated without limitation are FH or FO headers, is transmitted to the decompressor. The decompressor, upon receiving the first header FH(n) or FO(n) (it could be a header other than the first header) transmits back an Ack(n) which, upon receipt, causes the compressor to transition into a higher compression state which, as illustrated, is FO(N+i+1) or SO(n+i+1) which is the packet transmitted immediately after the reception of ACK(n).

FIGS. 16 and 17 illustrate switching of the state of compression of the compressor based on a parameter m which is a number of transmitted headers or ACK (switching access whenever m FO/FH headers are transmitted or ACK is received). The embodiment of FIG. 16 is not limited to FH/FO/SO header transmission by the compressor. In FIG. 16, an ACK(n) arrives before the number of FO/FH headers transmitted reaches m, which as the result of the preset number of headers FH/FO being transmitted, causes the compressor to switch to a higher state of compression and transmit packet FO(n+i) or SO(n+i). The embodiment of FIG. 17 is not limited to FH/FO/SO header transmission by the compressor. In FIG. 17, an ACK arrives after m headers are transmitted.

FIG. 18 illustrates switching of the state of compression of the compressor occurs after a set number of headers are sent without any acknowledgments.

Under different modes, the operation strategy of the compressor and decompressor are different.

Operation Modes of the Compressor

Strictly based on ACK: In this mode, the compressor strictly depends on the reception of the ACKs. If an ACK has not arrived on time due to loss, channel availability, decompressor conditions, etc., the compressor switches to a less compressed mode by for example increasing the length of the coding fields, and it only can switch back to a further compressed mode after it receives appropriate ACKs.

Loosely based on ACK: In this mode, ACK helps to improve the efficiency and reliability when received, but the compressor doesn't strictly depend on the reception of the ACK. If the compressor receives an appropriate ACK, it switches from a less compressed state to a further compressed state or stays in the current state if it is already in the further compressed state. If it hasn't received an appropriate ACK, it switches from a less compressed state to a further compressed state based on other criterions, e.g., sending a certain number of less compressed headers, instead of the reception of ACK.

Not based on ACK: The compressor normally operates in this mode when no reverse channel is available. In this mode, the criterion to transition from a less compressed state to a more compressed state is not ACK-based. Rather, the compressor may switch from a less compressed state to a more compressed state after a certain number of less compressed headers have been transmitted. Such number can be a tunable parameter. In addition, there are events that can trigger the compressor to send less compressed information in order to refresh the decompressor and reduce the chance of incorrect decompression.

Operation Modes of Decompressor

Sending deterministic ACK: In this mode, the decompressor sends ACKS periodically and when it receives FH/FO packets. In addition, the decompressor can send ACKs back to compressor more frequently than periodically when the reverse channel is light-loaded and available.

Sending opportunistic ACK: In this mode, the decompressor doesn't strictly send ACKs periodically. It sends ACK only when it has an opportunity to send an ACK, e.g., when the reverse channel is available to carry the ACK.

No ACK: In this mode, the compressor doesn't send ACKS at all.

One example application where the header compression and decompression scheme is useful is where Voice over IP (VoIP) (or IP-telephony) packets are transmitted over cellular systems. When VoIP is applied to cellular systems, it is important to minimize the overhead of the IP/UDP/RTP header due to the limited bandwidth of the wireless or air (RF) interface. In such a system for example, the ANI_AD interfaces the IP network to a computer terminal running RTP/UDP/IP (e.g., terminal 130) having a cellular or RF interface for receiving RTP packets over the wireless or RF link. This is merely one example application of the compression/decompression technique of the present invention.

Definitions n: Sequence number assigned by the compressor and carried in headers. The number n always increments by 1 for each new packet and independent of the RTP sequence number. Note that n may be coded in either k-bits (=(CD_SN)$_k$), or l_extended bits (=(CD_SN)l_extended).

CD_SN 139: Internal counter corresponding to n. The compressor and decompressor maintain their counters. The size of the internal counters can be chosen large enough to avoid any ambiguity for the duration of the session, e.g., 32 bits.

(CD_SN)k: k least significant bits of CD_SN. (CD_SN)k is normally sent in the compressed header.

(CD_SN)l_extended: l_extended least significant bits of CD_SN.

(CD_SN)l_extended is sent in the compressed header in the extended mode.

S_RFH: CD_SN of packet whose header is known to be correctly reconstructed by the decompressor; S_RFH is continuously updated by the compressor based on feedback from the decompressor. S_RFH is sent in the form of k or l_extended least significant bits.

N_elapsed: a counter maintained by the compressor to keep track the number of packets have been sent since the last ACKed packet. N_elapsed=current CD_SN−S_RFH, if S_RFH is always set equal to the last ACKed packet by the compressor when it receives an ACK.

R_RFH: CD_SN of reference packet at the decompressor, which is set equal to S_RFH when an FO(n, S_RFH) packet is received.

SN(n): The RTP sequence number of nth packet sent by compressor. If the compressor does not do reordering, SN(n) is not necessarily a monotonically increasing sequence wherein n is defined by bit values of the k or l extended bits.

TS(n): The RTP time stamp of nth packet sent by compressing.

CFO(n): Current first order difference at packet n. Note that it is a vector, with each of its individual component equal to the difference between the corresponding field in packet n and in packet (n−1); for example, the time stamp component of CFO(n) is calculated as TS(n)−TS(n−1).

FO_DIFF($n_2$, $n_1$): First order difference at packet $n_2$, with respect to packet $n_1$. Each of its individual field is equal to the difference between the corresponding field in packet $n_2$ and in packet $n_1$; for example, the time stamp field of FO_DIFF($n_2$, $n_1$) is calculated as TS($n_2$)−TS($n_1$).

N_Last_Interr: The CD_SN corresponding to the most recent interruption (i.e. non-linear change). It is updated (by the compressor) to n whenever CFO(n) I=CFO(n−1).

S_DFOD: Default first order difference at the sender. S_DFOD is a vector that specifies the current pattern. S_DOD is used by the compressor to determine if the current header conforms to the pattern. The current header n conforms to the pattern if header(n)=header(n−1)+S_DFOD. When the pattern does not change from one string to the next, S_DFOD is static. Otherwise, the compressor has to determine S_DFOD on a dynamic basis.

TS_DFOD and SN_DFOD: the components in S_DFOD corresponding to RTP time stamp and sequence number, respectively.

R_DFOD: Default first order difference at the compressor. R_DFOD is a vector that specifies the current pattern. R_DOD is used by the decompressor to decompress SO headers. When the pattern does not change from one string to the next, R_DFOD is static. Otherwise, the decompressor has to determine R_DFOD on a dynamic basis. By design, S_DFOD and R_DFOD are always equal during SO state.

Extended_flag: A flag maintained by the compressor. If it is TRUE, then l_extended bits are used for the CD_SN and other sequence parameters will be sent in the headers. Otherwise, (CD_SN)k will be sent. Note that this flag itself is also carried in the headers so that the decompressor knows which coding of CD_SN is used.

Header(n): A term used generically to mean the header information sent by the compressor. Header(n) can be sent in various forms, FH(n), FO(n, S_RFH), SO(n), depending on the state of the compressor. Note that in the header, n is actually coded as (CD_SN)k or (CD_SN)l_extended, depending the extended flag.

Diff($n_2$, $n_1$): The true distance between $n_2$ and $n_1$, which are coded as (CD_SN)k or (CD_SN)l_extended. Diff($n_2$, $n_1$)=CD_SN($n_2$)−CD_SN($n_1$), where CD_SN($n_2$) and CD_SN($n_1$) are the CD_SN corresponding to $n_2$ and $n_1$ respectively. For example, if the first packet carries (CD_SN)k=14 and the second one carries (CD_SN)k=1, then the true distance is (16+1+14)=3, not (1−14)=−13.

FH_Req: Sent by the decompressor to request the compressor to operate in the FH state. This is used for example when the decompressor just recovered from a crash and no longer has reliable state information.

ACK(n): Sent in response to header(n). An ACK means that packet(n) is correctly received.

Seq_cycle: Seq_cycle−1 is the maximum number reached by the sequence number before wrapping around and going back to 0. Seq_cycle=$2^k$.

SEQ Ext_cycle: =$2^{l\_extended}$.

HSW 117: The compressor maintains a sliding window of headers sent to the decompressor (HSW): header(n), header (n+1), header (n+2), etc. The headers could have been sent in the form of FH, FO or SO. When the compressor receives an ACK(n), it will delete any Header (p) where p<$n_2$−$n_1$ and also move Header(p=n) to Header (S_RFH). Static fields do not need to be stored as multiple entries in HSW. Only a single copy of the static fields is needed. Note that in HSW, each header is marked with a color, either green or red.

Color of a header (packet): It is green if the CD_SN carried in the header (packet) is coded in k bits. Otherwise, it is red, e.g. l extended bits. In implementation, a 1-bit flag can be used to store the color. The color is used to assist the compressor to uniquely identify a header when receiving an ACK.

OAW 135: The decompressor maintains a sliding window of headers it has successfully decompressed and ACKed: header (n1), header (n2), header (n3). Note that the ACKs are not known for sure to be received by the compressor. The window will be referred to as the outstanding Ack window (OAW). Static fields do not need to be stored as multiple entries in OAW. Only a single copy of the static fields is needed.

R_Last_Decomp: The CD_SN of the last reconstructed packet by the decompressor. The decompressor maintains the corresponding full header which is referred as FH(Last_Decomp).

Note:

The original IP, UDP and RTP headers are transferred, except for changes described below.

The Total Length field of IP header (2 bytes) is replaced with extended_flag (1 bit), seq_num (4 or 8 bits), and other optional information. If extended_flag is equal to 1, seq_num is 8-bit long, i.e. the packet is sent in extended mode.

The Length field in the UDP header (2 bytes) is also replaced with the context ID for header compression, referred as CID. The compressor can simultaneously compress multiple RTP flows independent of each other. Each flow is assigned a unique CID. In implementation, CID could be either 1-byte or 2-byte long, depending on the maximum number of RTP flows at any given time.

A first embodiment of the invention, which may be practiced with the system of FIG. 2, increases the probability of reception of FH and FO type packets so that there is a timely progression towards the most optimal SO state. The probability of reception may be increased by applying additional error protection to the FH and FO packets in the form of Error Correcting Codes Error Correcting Codes+Interleaving Duplicate Transmission of FH and FO header data.

Figure 5A:
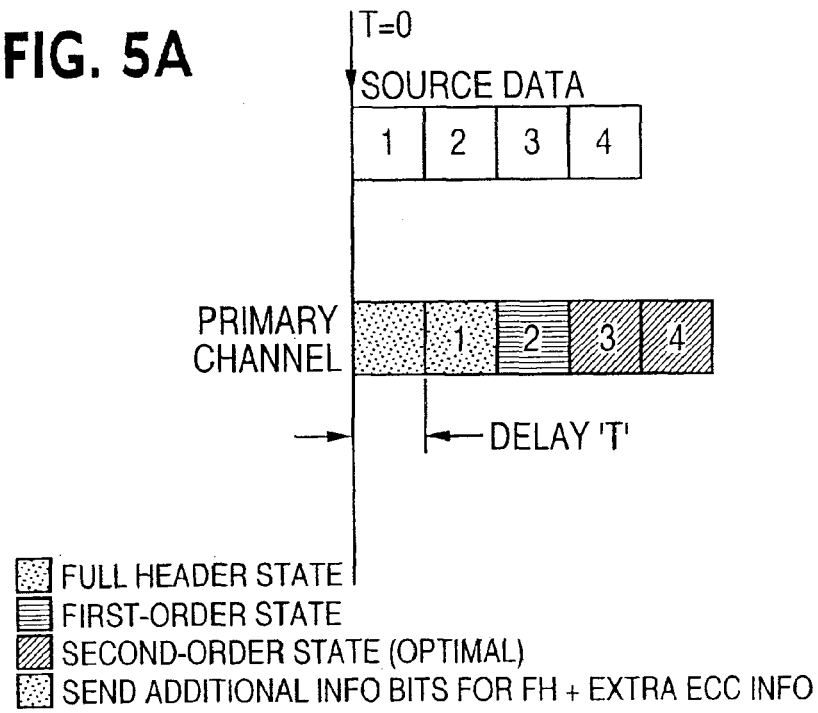
FIGS. 5A and 5B illustrate a first embodiment of the present invention.
Figure 5B:
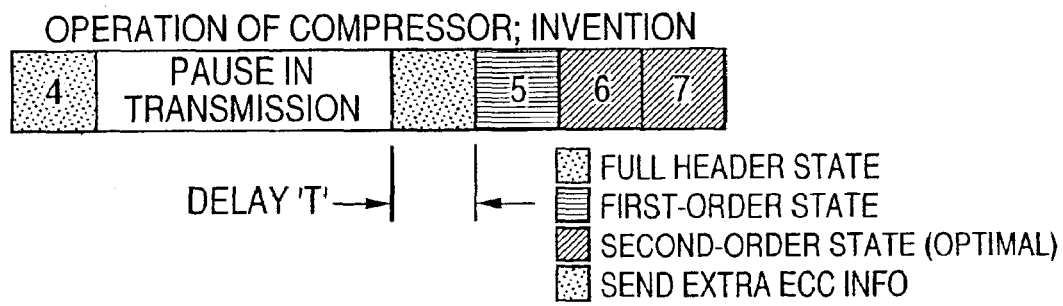

The first embodiment of the invention provides extra protection against loss of data packets over a lossy transmission medium, e.g. wireless without allocating additional channel resources to the compressor and decompressor. The extra bandwidth is obtained by delaying transmission of the data stream by some interval of tire, 'T', as illustrated in FIGS. 5A and 5B, such that there is enough time to send the extra data packets. The delay interval can be used to send initial FH packets, and FO packets at any time.

Transmission of Initial FH packets: It is assumed that the bandwidth on the communication channel has been allocated under the assumption that primarily FO and SO packets will be transmitted (i.e, very few FH packets are transmitted). This is a reasonable assumption in most cases, since effectiveness of the compression scheme as a whole is reliant on operation primarily in the SO state. However, there is always a need to send some number of FH packets (ideally, just one) at the start of a session. The size of an FH packet is significantly more than that of SO or FO packets. This means that additional bandwidth is required in order to deliver the packet within the same time period as that allocated for SO and FO packets. Transmission of part of the FH packet occurs on the primary channel and the rest on some secondary channel.

The aforementioned interval of delay, 'T' illustrated in FIGS. 5A and 5B, is utilized to transmit the additional data carried within an FH packet. Doing so eliminates the need to use a secondary channel. Savings can be significant, since the secondary channel may be difficult (in terms of protocol), costly (if it needs to be a dedicated channel which is used only occasionally), and slow to set up (if it needs to be a shared packet-based channel, undesired contention delays would be observed). Note that, depending of the value of 'T' and size of the transmission blocks, it may be possible to include error correction coding (ECC) in the 'extra' bandwidth block as well.

Transmission of FO packets: This scheme is applicable only when the need to transmit the FO packet coincides with a pause in data stream transmission. Because, by definition, FO packets are generated when there is a disruption in the normal data flow, this condition is nearly always met. For example, intervals of silence cause irregular jumps in the RTP time stamp which can trigger transmission of FO packets.

The transmitter(s)/receiver(s) (compressor(s)/decompressor(s) of FIG. 2) can operate in a more optimal state when additional error protection is used. In the prior art, less frequent operation in the optimal SO state occurs.

The penalty for this increased operation in the optimal state is a fixed delay which is always present in the data stream. However, this delay can be easily tolerated within limits specific to the data being transmitted.

As an example, assume speech data+FO type header data readily fits into a cellular transmission block of size p bytes, corresponding to an interval of time equivalent to 20 mS. Assuming a delay, T=20 mS is applied in the manner described above, it is possible to send the FO+speech data+an equivalent amount of data to increase probability of reception. Some potential configurations are:

Speech data+FO type header+½ rate convolutional code bits are sent to increase probability of data reception. This considerably increases probability of correct reception. A ½ rate code completely utilizes the additional bandwidth afforded by the delay.

Two identical copies of the speech data+FO type header may be sent; which increases the probability of reception, particularly when the transmission media is subject to random packet loss.

A second embodiment of the invention, which may be practiced with the system of FIG. 2, is based upon IP/UDP/RTP fields most of the time being either constant or can be extrapolated in a linear fashion. In those instances, the compressed header just carries a multiple non extended sequence number having k bits that provides sufficient information for linear extrapolation. Like RFC 2508, with the invention when linear extrapolation results in incorrect header reconstruction, the transmitter sends FO difference information. Unlike RFC 2508, the difference information is calculated with respect to a reference packet known to be correctly received, rather than the one immediately preceding the current packet. This feature ensures that the current header can be reliably reconstructed even if one or more past packets were lost. Since the header can be reliably reconstructed in that manner, there is no need to send a full header. The reference is determined and updated by the compressor of the receiver according to acknowledgments received from the decompressor.

The compressor uses as a reference header a header which is known to be correctly decompressed based on received acknowledgments (ACKS) as illustrated generally in FIG. 6. The compressor sends a series of full header packets FH(n) ... FH (n+i+1) ... which cover a time sequence just prior to $t_2$ at which time the acknowledgment ACK(n) produced by the compressor receiving full header packet FH(n) is received. The transition from FH to FO (FO(n+j) as illustrated) is synchronous. The time sequence to $t_2$ is dependent on the round trip radio transmission time.

Figure 7:
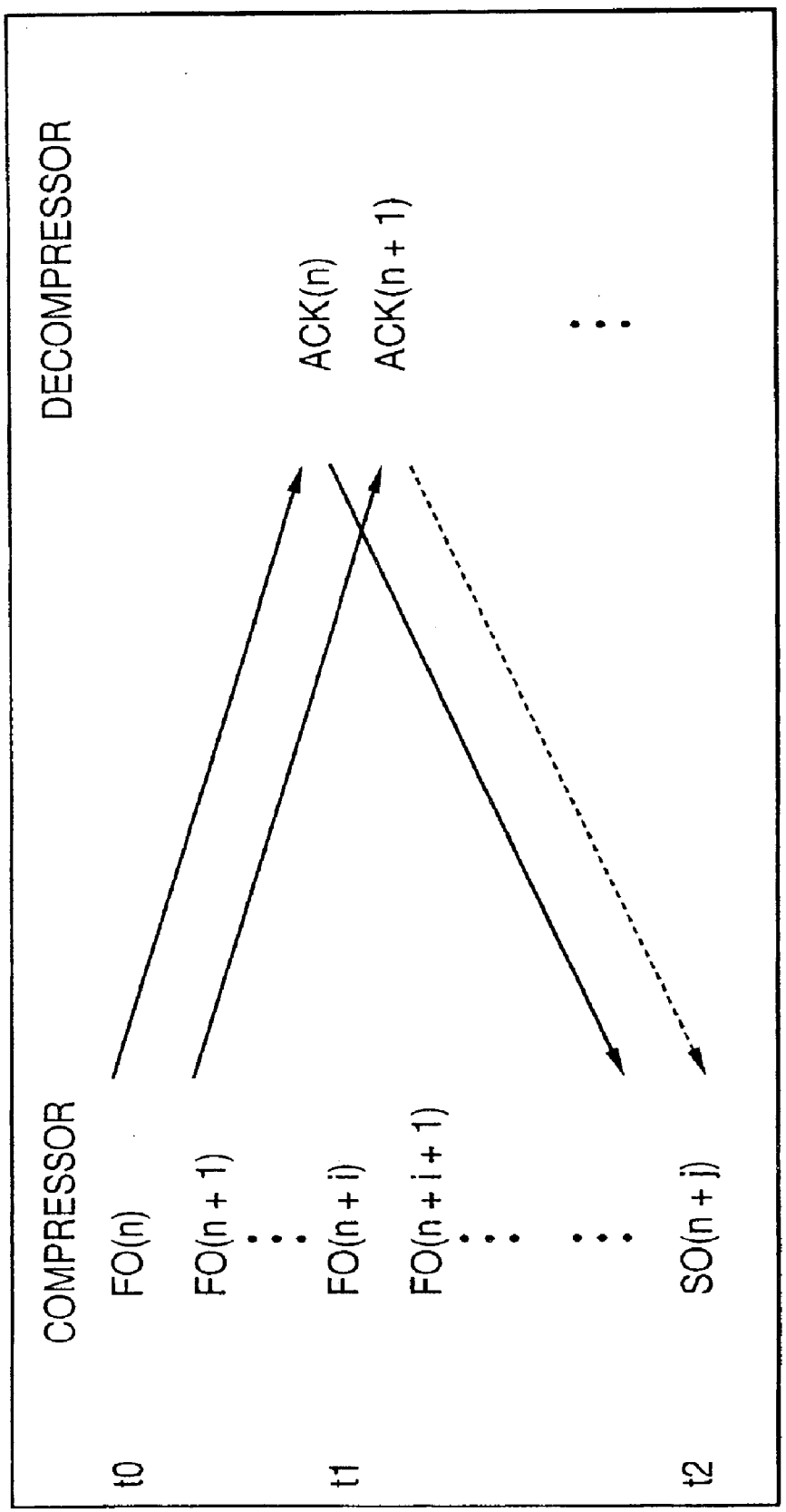
FIG. 7 illustrates the transition of a compressor from transmitting headers with a first order of compression to headers with a second order of compression in accordance with the present invention.

FIG. 7 illustrates the transition of the compressor from transmitting first order packets FO (FO(n), to FO (n+i+1) ... with at least one acknowledgment ACK(n) and optionally ACK(n+1) being generated by the decompressor before the compressor synchronously transitions to the second order packets SO(SOn+j) with a round trip radio delay to time $t_2$ required for synchronization. The number of ACKs required by the compressor before transition from the FO state to the SO state is dependent on the variations between packets. For example, if the variation between packets is linear with constant parameters, only one ACK is required to transition from FO state to SO state. To be able to decompress the current header, the decompressor only needs to know the reference header instead of the immediately preceding header as with RFC 2508. In this scheme, the compressor sends full headers (FH type headers) at initialization. It sends first order difference information (FO type headers) when linear extrapolation does not apply. However, the compressor does not transmit SO difference headers until the preceding FH or FO has been acknowledged, and linear extrapolation applies.

At the compressor, the reference packet is defined to be the last one whose ACK has been received. Specifically, when the transmitter receives ACK(n), an acknowledgment for packet n, it will retrieve packet n previously stored in memory and save it as the reference packet (packet n was stored in memory when it was sent). Subsequently, all header compression is done with reference to that packet, until a new ACK is received, at which point the packet that has just been ACKed becomes the new reference packet. The memory in the transmitter where the potential reference packets are stored is referred to as the header sent window (HSW) depicted as entity 117 in FIG. 2. If a FO difference information has to be sent in the compressed header, the compressor will explicity include the sequence number of the reference packet (reference sequence number).

At the decompressor, when an ACK(n) is sent, header(n) is stored in the outstanding acknowledgment window (OAW) depicted as entity 135 of FIG. 2. Subsequently, when a FO difference header is received, the decompressor will determine the reference packet from the reference sequence number, retrieve the corresponding reference packet from the OAW 135 and use it to reconstruct the full header.

The invention uses the linearity of RTP time stamps generated at the compressor which closely follow a linear pattern as a function of the time of the day clock. Based on the Umer 134 maintained at the decompressor of the receiver and using an extended sequence number for FO packets defined by l extended bits, all of a long loss within a threshold can be detected and recovered.

With speech being assumed, if the time interval between consecutive speech samples and packets is t msec, then the RTP time stamp of header n (generated at time n*t msec) equals the RTP time stamp of header 0 (generated at time 0) plus TS_stride*n, where TS_stride is a constant dependent on a voice codec of the voice source of the transmitter. Consequently, the RTP time stamp in headers received by the decompressor follows a linear pattern as a function of time, but less closely than the compressor, due to the delay jitter between the compressor and the decompressor. In normal operation (absence of crashes or failures), the delay jitter is bounded, to meet the requirements of conversational real-time traffic.

A string occurs as a sequence of headers that all conform to a particular pattern. Specifically, the RTP sequence number (SN) is incremented by 1 from one header to the next. The RTP time stamp (TS) is non decreasing, and follows some predictable pattern: If headers $n_1$ and $n_2$ are in the same string, the TS of header $n_2$ can be derived from the TS of header $n_1$ and the pattern function. The other field values, except perhaps for UDP checksum and IP Id, do not change within the string. Thus, once a header, e.g. $n_1$ has been correctly decompressed, the subsequent headers in the same string can be decompressed by extrapolation according to the pattern. Once the compressor determines that a header has been successfully decompressed, and the pattern acquired by the decompressor, it just has to send a k-bit sequence number, denoted $(CD\_SN)_k$, as a compressed header for the subsequent packets in the same string. (CD_SN)k are the k least significant bits of a larger (compressor) decompressor sequence number (CD_SN).

In this scheme, the decompressor uses timer 134 or another timer not illustrated in FIG. 2 to obtain the time elapsed between two consecutively received packets. Based on such timing information and the particular compression rule which is used by the compressor along with the sequence number, the decompressor can detect and/or recover from the long loss.
Let HDR(i) be the header with short sequence number i HDR($n_1$) be the last header which has been successfully decompressed HDR($n_2$) be the header which has been received right after HDR($n_1$)

TS_stride be the RTP TS increment every t msec

SEQ_CYCLE be the cycle of sequence number used in HDR

DIFF($n_2$, $n_1$) be the difference between packets with sequence number $n_2$ and $n_1$.

It is defined as follows:

DIFF($n_2$, $n_1$)=$n_1$ when $n_2 > n_1$

DIFF($n_2$, $n_1$) $n_2+2^k-n_1$ when $n_2 \leq n_1$

Upon receiving HDR($n_2$) right after receiving HDR($n_1$), the decompressor determines whether or not a long loss happened between these two packets, i.e., whether or not there are DIFF($n_2$, $n_1$) packets lost or there are SEQ_CYLE*p+DIFF($n_2$, $n_1$) (p>1) packets lost. The detection scheme also relies on the type of HDR($n_2$). Based on the three header types defined in header compression schemes, 2 cases are listed as follows.

Case 1: HDR($n_1$), SO($n_2$)

Case 2: HDR($n_1$), FO($n_2$).

Long Loss Detection and Recovery for Case 1

To detect whether or not there is long loss in case 1, a timer (e.g. timer 134) is maintained at the compressor, and it is checked and updated whenever a packet is received.

Let

T be the time when HDR($n_1$) is received

T+ΔT be the time when HDR($n_2$) is received.

The compressor sends SO packets only if the one or more preceding FH or FO packets have been acknowledged, and also linear extrapolation applies from the acknowledged header. Therefore, If HDR($n_2$) is SO and no matter what type HDR($n_1$) is, linear extrapolation applies from HDR($n_1$) to HDR($n_2$). This basically means that the RTP time stamp and RTP sequence number for packet $n_1$ through $n_2$ when generated at the compressor, closely follows a linear pattern as a function of the time of day clock. Consequently, the headers coming into the decompressor also follow a linear pattern as a function of time, but with fluctuation due to jitter between transmitter and receiver.

Under the assumption that the upper bound of jitter is always less than (SEQ_CYCLE*t) msec, the following rule to detect long loss applies:

[Rule 1]

if (DIFF($n_2,n_1$)*t msec≦ΔT<(DIFF($n_2,n_1$)+SEQ_ CYCLE)*t msec), only DIFF($n_2,n_1$) packets are lost;

if ((DIFF($n_2,n_1$)+SEQ_CYCLE)*t msec≦ΔT<(DIFF($n_2$, $n_1$)+2*SEQ_CYCLE)*t msec), (SEQ_CYCLE+DIFF ($n_2,n_1$)) packets are lost;

In general, if ((DIFF($n_2,n_1$)+i*SEQ_CYCLE)*t msec≦ΔT<(DIFF($n_2,n_1$)+(i+1)*SEQ_CYCLE)*t msec), (i*SEQ_CYCLE+DIFF($n_2,n_1$)) packets are lost;

To recover RTP time stamp and RTP sequence number from such long loss, only the number of lost packets is needed.

Let $N_{loss}$ be the number of packets lost between packet $n_1$ and packet $n_2$ which can be obtained based on rule 1

TS(i) and SEQ(i) are the RTP time stamp and RTP sequence number of packet i

The RTP time stamp and RTP sequence number can be derived by the RTP time stamp and RTP sequence number of packet $n_1$ as well as $N_{loss}$ which are shown in the following formula.

$$TS(n_2)=TS(n_1)+N_{loss}*TS\_STRIDE$$

$$SEQ(n_2)=SEQ(n_1)+N_{loss}$$

Figure 8:
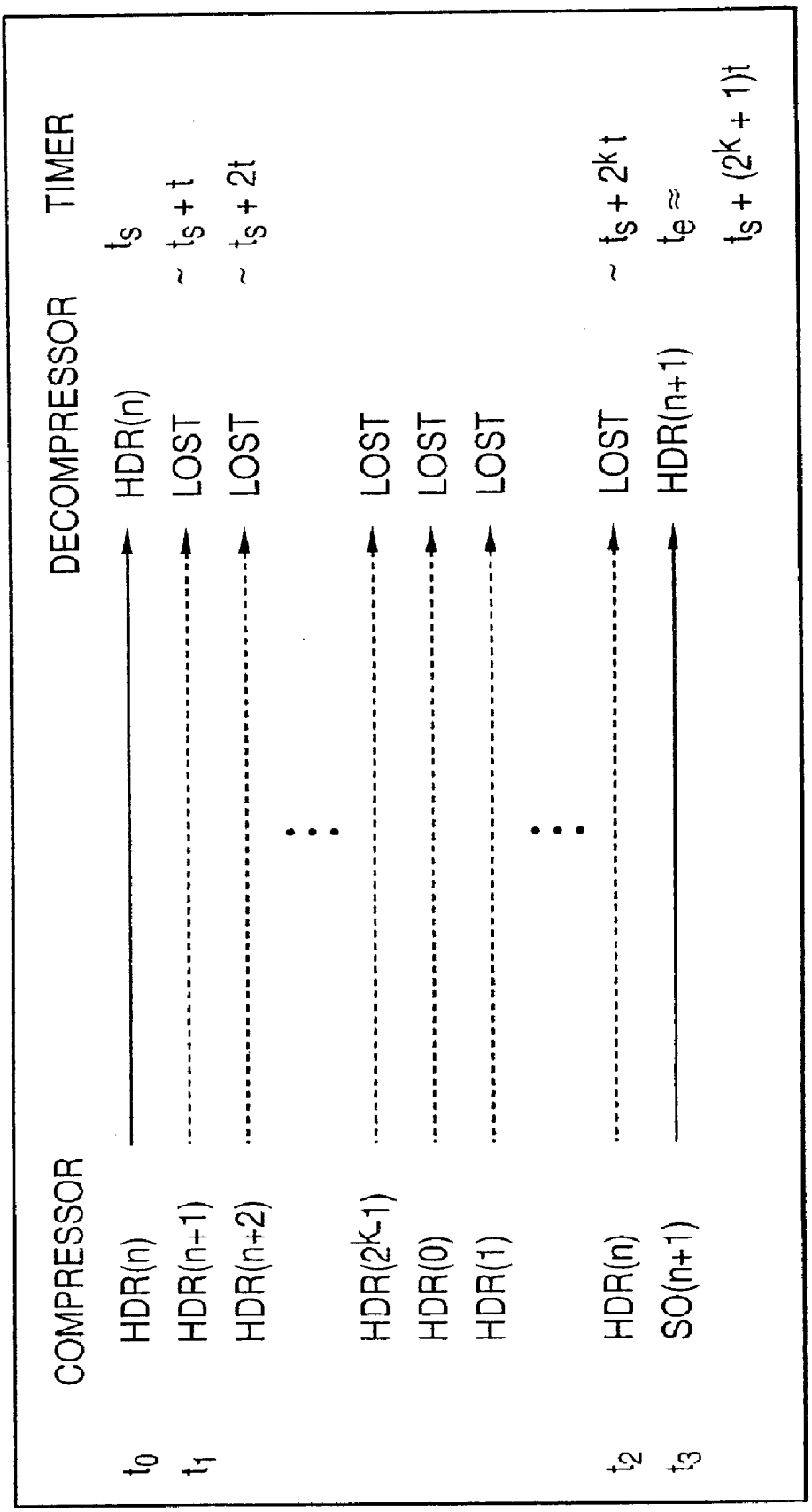
FIG. 8 illustrates the detection and recovery of packets when a wraparound having a number of packets greater than $2^k$ occurs where k bits are used to encode sequence numbers n defined by the k bits.

FIG. 8 illustrates an embodiment of the invention which detects and recovers from long loss in case 1 to detect long loss when a wraparound in the loss occurs where more packets are lost than $2^k$ wherein k is the number of bits in the sequence number SN(n) of the packets. Assuming decompressor receives HDR(n) which is sent at time t0, and all the packets sent between t1 to t3 have been lost, and then decompressor receives SO(n+1) which is sent at time t3. Since packet n+1 sent at time t3 is a SO packet which indicates that all the packets sent from t0 to t3 fall into the same string, i.e. the RTP sequence number Sn(n) of these packets follows a linear pattern as a function of time of the day clock, the number of packets lost between t0 and t3 can be detected by the timer 134 maintained in the decompressor. The procedure is as follows:

Assuming the time interval between consecutive speech samples and packets is t msec., the decompressor starts its local timer 134 (with value $t_s$) when it receives HDR(n) sent at time t0, then the timer increases based on the day clock. When SO(n+1) sent at time t3 is received at the decompressor, the timer would reach $t_0$ which approximately equals $t_s + (2^k+1)t$ due to jitter. Since the time difference between $t_s$ and $t_e$ (around $(2^k+1)t$) is larger than t msec., packet n sent at time $t_0$ and packet n+1 sent at time t3 won't be consecutively sent packets and a long loss happens between these two packets. In addition, since the time difference between $t_s$ and $t_e$ is smaller than $(2^{k+1}+1)t$, there won't be more than one sequence cycle of packet loss. Therefore, the decompressor can conclude that there are $2^k$ packets lost.

Long Loss Detection and Recovery for Case 2

The long loss detection and recovery scheme cannot be applied to case 2 where the FO header is received after a SO, FO or FH header. In this case, even if the time difference $\Delta t$ between packet $n_2$ and $n_1$ is larger than (DIFF($n_2,n_1$)+SEQ_CYCLE)*t msec, it doesn't mean that long loss happened because it may be due to silence period from the compressor. In this case, based on the information provided in the FO header, the RTP TS can be successfully regenerated, but not RTP sequence number because long loss or silence can not be distinguished just based on timing. To solve this problem, an extended sequence number is used having l_extended bits (l_extended>k non extended bits) for the first FO packets within a FO series where all the packets belong to the same string, until there is ACK for FO sent back from decompressor. This scheme detects and recovers from long loss under the assumption that the upper bound of long loss is less than $2^{l\_extended}*t$ msec.

To implement this scheme, an internal counter CD_SN 139 for packets is maintained by the compressor. The CD_SN 139 counts every packet sent out from compressor of the transmitter. The sequence number sent in the modified full header and compressed header is just a snap shot of the non extended k or l_extended least significant bits of the CD_SN 139. Based on the rule of the header compression/decompression scheme, the decompressor is able to reconstruct the current absolute number of received packets.

Let

CD_SN_LAST be the absolute packet number of last packet received, i.e., packet $n_1$;

CD_SN_CURR be the absolute sequence number for the current FO packet, i.e., packet $n_2$; and DIFF(CD_SN_CURR, CD_SN_LAST) be defined as (CD_SN_CURR)−(CD_SN_LAST).

Based on the following rule, a long loss within the upper bound of $2^{l\_extended}*t$ msec can be detected successfully.

[Rule 2]

if (DIFF(CD_SN_CURR, CD_SN_LAST)>$2^k$, a long loss is detected.

The number of packets lost $N_{loss}$ can be calculated with the following formula:

$$N_{loss}=DIFF(CD\_SN\_CURR, CD\_SN\_LAST)=(CD\_SN\_)-(CURR-CD\_SN\_LAST).$$

Based on $N_{loss}$ the RTP sequence number can be regenerated by the decompressor under the following formulas and the RTP time stamp can be regenerated based on the reference header and the corresponding delta.

$$SEQ(n_2)=SEQ(n_1)+N_{loss}$$

Since the extended sequence number uses more bandwidth than normal sequence number in view of its larger number of bits, it is not suggested to use it frequently, but just for first FO packets until ACK for this series of FO comes back to the compressor.

It should be noted that this scheme cannot detect and recover from long loss which is longer than $2^{l\_extended}*t$ msec; therefore, l_extended should be selected carefully so that it can detect the long loss which cannot be indicated from the lower layer of the protocol stack. If the long loss is longer than $2^{l\_extended}*t$ msec, it is required that a lower layer can provide indication of such extremely long loss, and disconnection at lower layer or other long loss recovery methods, e.g., sending a request to compressor, is applied.

When the compressor needs to send a series of FO type packets where all the packets belong to the same string, it uses sequence number with l_extended bits until at least one ACK for this series of packets comes back from decompressor. But when a SO packet is needed to be sent, the compressor just uses a k-bit sequence number.

At the compressor, timer 134 (or another timer not illustrated in FIG. 2) is started whenever a packet arrives. The timer runs until the next packet arrives. If the incoming packet is of FH type, no timing information is needed and the timer should be reset.

If the incoming packet is of FO type, rule 2 is applied to check whether or not a long loss has happened and corresponding recovery scheme for FO packet transmission should be used to recover from long loss if it happened. No timing information is needed and the timer should be reset.

If the incoming packet is of SO type, the arrival time difference between the current packet and the previously received packet should be calculated according to the timer, and rule 1 will be applied to check whether or not long loss happened and the corresponding recovery scheme for SO packet transmission should be used to recover from long loss if it happened. The timer 134 (or other timer) should be reset right after the checking.

In summary, the use of timer 134 (or other timer) and an extended sequence number for the first FO packets can successfully detect and recover from long loss within a threshold ($2^{l\_extended}*t$ msec) and improve robustness without adding too much overhead and complexity.

A further embodiment of the invention, practiced with the system of FIG. 2, uses the fact that the IP/UDP/RTP fields are either constant or can be extrapolated from a predictable pattern. In those instances, the compressed header just carries a non extended sequence number having k bits that provides sufficient information for extrapolation. When extrapolation would result in incorrect decompression for one or more fields, the compressor sends the required additional information for those fields (update information).

To provide robustness to errors and error bursts, the compressor encodes the update information with respect to a reference header known to be correctly decompressed. The compressor knows a header is correctly decompressed when it receives the corresponding acknowledgment. An ACK mechanism ensures that the current header can be reliably reconstructed even if one or more past headers were lost.

A string is defined as a sequence of headers that all conform to a particular pattern. The RTP sequence number (SN) is incremented by 1 from one header to the next. The RTP time stamp (TS) is non decreasing, and follows some predictable pattern. If headers $n_1$ and $n_2$ are in the same string, the TS of header $n_2$ can be derived from the product of sequence number offset p between $n_2$ and $n_1$ and TS and the pattern function. The other field values, except perhaps for a UDP checksum and IP Id, do not change within the string. Thus, once a header, $n_1$, has been correctly decompressed, the subsequent headers in the same string can be decompressed by extrapolation according to the pattern. Once the compressor is informed that a header has been successfully decompressed, and the pattern has been acquired by the decompressor (as evidenced by the ACKs), it just sends a sequence number, as a compressed header for the subsequent packets in the same string.

In the case of voice, the TS has a linearly increasing pattern. Thus the TS of header ($n_2$) can be calculated as: $TS(n_2)=TS(n_1)+TS\_stride*p$, where TS_stride is the time stamp increment between two consecutive headers and p is the sequent number offset between packets $n_2$ and $n_1$. A silent interval breaks the linear relationship and causes a string to terminate. A new string starts with a new talk spurt.

Thus the compressor goes through three different phases: initialization, update and extrapolation. A session starts with an initialization phase. In that phase, the compressor sends full headers to the decompressor until an ACK is received. After the initialization is completed, when a string starts, the compressor of the transmitter enters an update phase, where it sends the necessary update information to the decompressor. Once the compressor receives an ACK or ACKs indicating the decompressor has acquired the information necessary to do the extrapolation, the compressor transitions to the extrapolation phase. In the extrapolation phase, the compressor only sends a sequence number as each compressed header, until the string ends. When another string starts, the compressor of the transmitter enters another update phase, and the whole process is repeated. The headers sent in the initialization, update and extrapolation phases are FH, FO and SO. FH, FO and SO all carry a sequence number incremented by 1 at each header sent by the compressor SO essentially consists only of that sequence number. In the following, the ACKs sent in response to FH and FO are called FH ACK and FO ACK respectively.

Long Error Burst and Loss of Synchronization—Periodic ACKs

Figure 9:
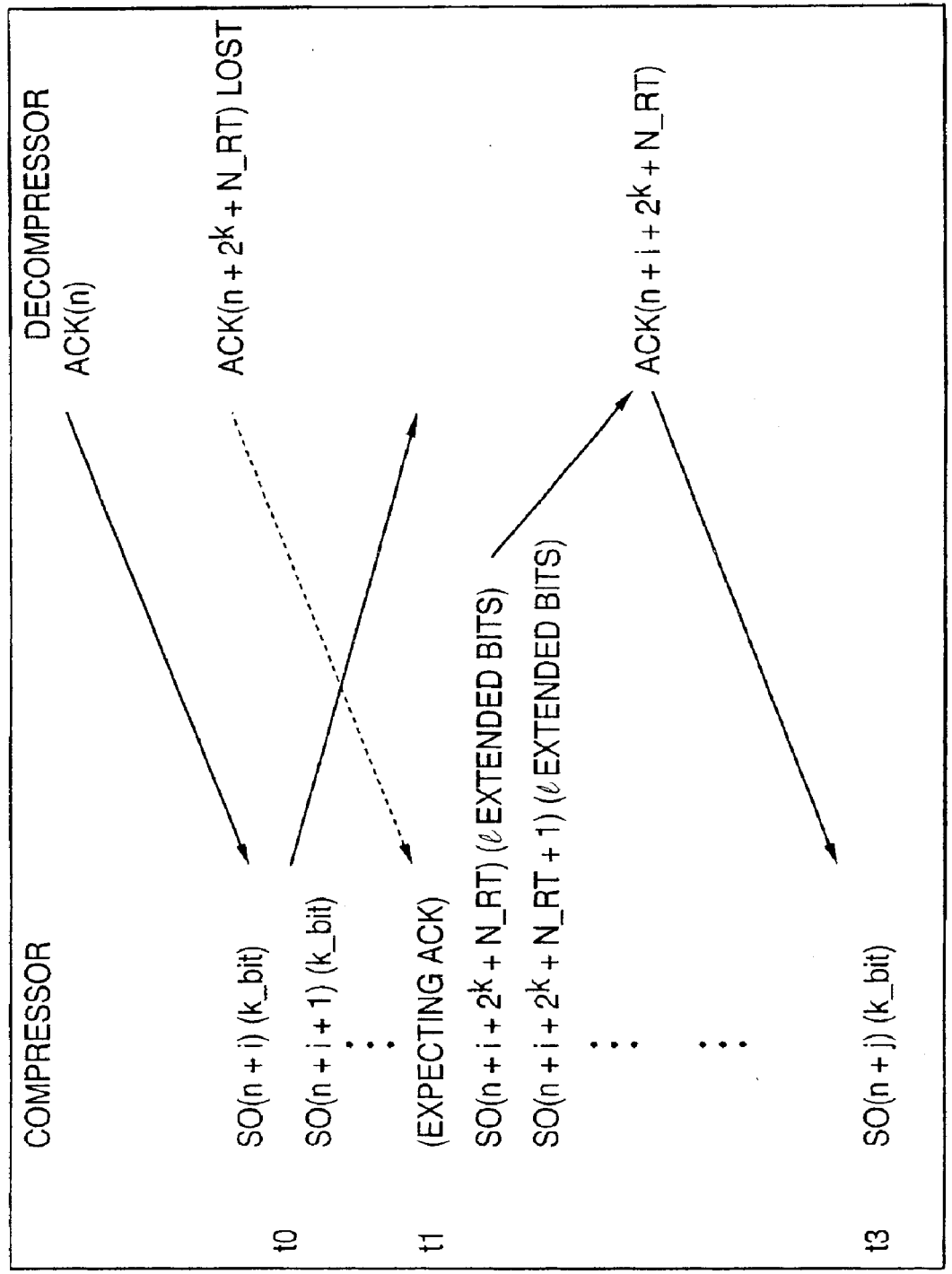
FIG. 9 illustrates the operation of a compressor and decompressor using acknowledgments to control the transition between sequence numbers having k bits and l extended bits and back to k bits in accordance with the present invention.

If the above sequence number is coded with k bits, it will wrap around every seq_cycle headers (seq_cycle=$2^k$). Therefore, if an error burst lasts longer than the duration of seq_cycle headers, the decompressor cannot unambiguously determine the number of elapsed headers just from the sequence number, and consequently cannot perform proper decompression. To address this wrap-around and long burst problem, periodic acknowledgments (ACKs) are used. FIG. 9 illustrates the operation of the invention using the k bit sequence numbers and l bit extended bit numbers in association with periodic acknowledgments (ACKs) which are synchronously generated by the decompressor on every detected $2^k$ received packets. Assuming the compressor receives the ACK(n) for packet n before it sends SO packet n+i with a k bit sequence number, the compressor is expecting another ACK for packet (n+$2^k$+N_RT) from the decompressor before it sends packet (n+i+$2^k$+N_RT). Assuming ACK(n+2+N_RT) is lost during the transmission, the compressor transfers to the extended state using l bits and sends packet (n+i+$2^k$+N_RT) with an l extended bit sequence number. When the decompressor receives the packet (n+i+$2^k$+N_RT) with an l extended sequence number, it sends an ACK (n+i+$2^k$+N_RT) back to compressor. When the compressor receives the ACK(n+1+$2^k$+N_RT), it transfers back to non-extended state, and sends packet SO(n+j) with just a k-bit sequence number. The decompressor is expected to send an ACK at regular intervals, spaced closely enough so that normally the compressor receives an ACK at least once every $2^k$ seq_cycle headers. The compressor maintains a counter, N_elapsed, to keep track of the number of packets elapsed since the last ACK it received. If N_elapsed>$2^k$ seq_cycle headers, the compressor operates in extended mode, where l_extended bits, rather than a smaller number of non extended k bits are used for the sequence number, with the number of l_extended bits>the number of k non extended bits. The l_extended-bit sequence number and the reduced number of k bits in the non extended sequence number can be seen as the least significant bits of the non extended sequence number and l_extended bits being the least significant bits of the count CD_SN 139 of the transmitter. They are denoted (CD_SN) k and (CD_SN) l_extended respectively. N_elapsed will increment by 1 for each packet sent by the compressor. The sequence number SN only decreases when the compressor receives an ACK from the decompressor, and allows the compressor to switch back to the normal mode, i.e. use the present number of least significant bits of CD_SN. These ACKs are referred to as periodic ACKs. ACKs may be non-periodic as described below when, for example, the channel on which the ACKs are sent is busy which requires the ACK to be delayed in a non-periodic manner.

To account for the round trip delay, the decompressor of the receiver needs to anticipate when to send a periodic ACK. The decompressor has to send a periodic ACK early enough so the compressor normally receives ACKs at least once every seq_cycle. Taking into account the round trip time, the decompressor has to send ACKs at least once every (seq_cycle —N_RT) headers. The quantity N_RT is calculated as EST_RTT/T_H, rounded up to the next higher integer. The quantity EST_RTT is an estimate of the current round trip delay calculated by the decompressor and can be either evaluated dynamically based on recent measurements, or simply set to RTT_n (defined below). In practice, T_H can be derived either from the codec characteristics of the transmitter, or from the actual spacing observed.

Assumptions

In order to ensure correctness and achieve high performance, some assumptions need to be made about the communications channel between the compressor and the decompressor (CD-CC). The channel could be a link or a concatenation of links (network or networks).

Packets transferred through the forward and reverse channel may be lost or corrupted, but their orders are maintained (i.e., FIFO pipe). The quantity MAX_EB is defined as the maximum number of consecutive packets that could be lost over the CD_CC. In practice, for cellular links, MAX_EB is enforced by the lower layers of the protocol stack which decide to drop the connection when a threshold of consecutive lost packets is reached.

The channel may perform fragmentation at and reassembly at the decompressor, but preserves and provides the length of packets being transferred. Note that this fragmentation is different from IP fragmentation.

This scheme assumes there is a mechanism to detect errors between the compressor and decompressor. It is assumed the channel provides that error detection. If no error detection is available from the channel, the scheme can be extended in a straightforward fashion by adding an error detection code at the compressor-decompressor level. Error correction is beneficial but optional.

The round-trip delay between the compressor and decompressor is defined as the time to send and process a header (n), to process it, and return an ACK(n). To avoid any ambiguity on which original message is being ACKed, the ACK must not experience a round trip delay so long that the (CD_SN)Q extended in the forward direction has wrapped around. It is reasonable to assume that the time to send header(n) and process it are bounded, due to the real-time traffic requirements. The time to return ACK(n) depends on the reverse channel used to transmit it. For example, if the channel is contention-based, it may experience queuing delay. The lower layers are assumed to enforce a delay limit on the transmission of ACK, if necessary by discarding those ACKs which have stayed in the queue for too long. Based on these considerations, it is assumed there is an upper bound of the round trip delay: RTT_UB. In addition, there is a nominal round trip delay, denoted RTT_n, which is the most likely round trip delay during normal operation. Obviously RTT_n<RTT_UB. Estimation of RTT_n should be made before implementation, since RTT_n is used to determine the optimal value of k (see below for explanation). Note that at run time, the receiver needs to estimate the actual round trip delay. Details are discussed below.

Based on assumption 1 and 4, to guarantee the correctness of the proposed scheme, the value of l_extended should satisfy the following conditions:

1. $2^{l\_extended} * T\_H \geq RTT\_UB$, where T_H is the time spacing between two consecutive headers; this is required to avoid ambiguity on the ACK
2. $2^{l\_extended} > MAX\_EB$; this is required to maintain sequence synchronization even when long bursts occur.

There is some flexibility to choose the value of Q. However, in order to achieve optimal performance, it should be fine tuned based on the distribution of channel error bursts (both forward and reverse direction) and the round trip delay. Following are some considerations:

1. $2^k * T\_H \geq RTT\_n$, to reduce the chance of the compressor switching to the extended mode due to late ACKs.
2. $2^k >$ the most likely number of consecutive packet losses. This is needed to reduce the chance that the compressor switches to the extended mode due to long error bursts.
3. K should not be too small. Otherwise, too many periodic ACKs will be sent from the decompressor to the compressor, causing flooding of the reverse channel and lowering of the compression efficiency. On the other hand, a large value of k will result in overhead carried in every header.

The basic concept is that, when the channel condition deteriorates, the compressor and the decompressor fallback using (CD_SN) l_extended bits to guarantee correctness. On the other hand, it will use shorter (CD_SN) k bits during normal channel conditions to achieve best efficiency. Details of switching between the two modes are discussed below.

Figure 10:
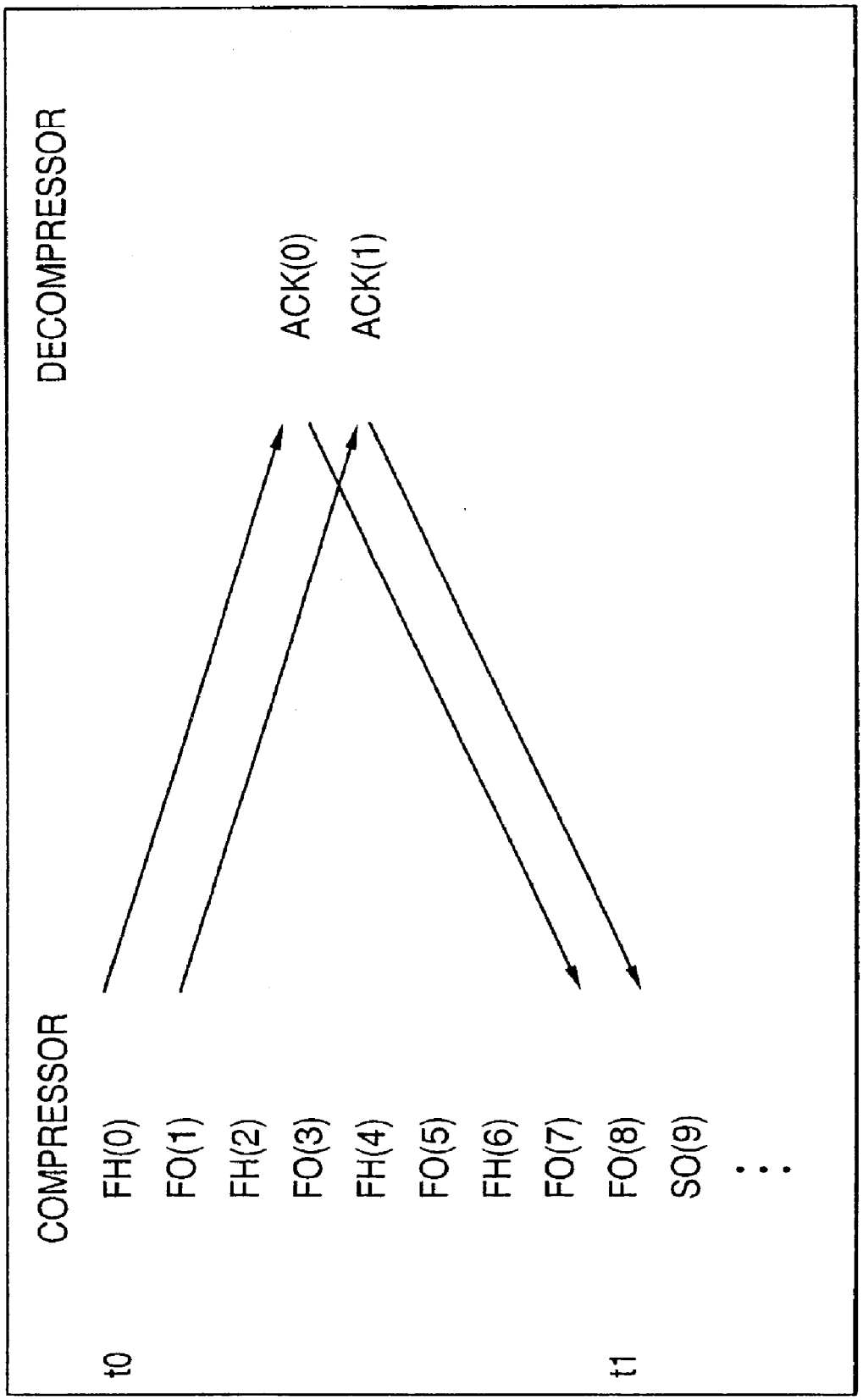
FIG. 10 illustrates bandwidth reduction in accordance with the present invention achieved by transmitting a sequence of FH and FO packets before an acknowledgment is generated by the decompressor signifying reception of a FH packet.

FIG. 10 illustrates a bandwidth reduction embodiment which sends at least one sequence of data packets, which transition in each sequence between different states of header consumption, from the compressor to the decompressor before an acknowledgment (ACK), generated by the decompressor, is received by the compressor to cause the compressor to transition the header compression to a greater degree of header compression. Because the compressor periodically, before receiving any acknowledgment, transmits headers with at least some compression, the resultant smaller number of bits transmitted before receiving an acknowledgment saves bandwidth. In the initialization phase, the compressor may, without limitation, alternate between full headers (FH) and first order headers (FO), i.e., a set of FH, then a set of FO, then a set of FH, then a set of FO, and so on, until an ACK is received. The sets may each include at least one header. The decompressor transmits an ACK when it correctly receives a FH. In FIG. 10, the alternate FH and FO headers are transmitted one after another, i.e., FH(O), FO(1), FH(2), FO(3), until the compressor receives the ACK (O) for packet 0 and uses the FH(O) as reference header from then on for decompression.

Multiple extrapolation

Figure 11:
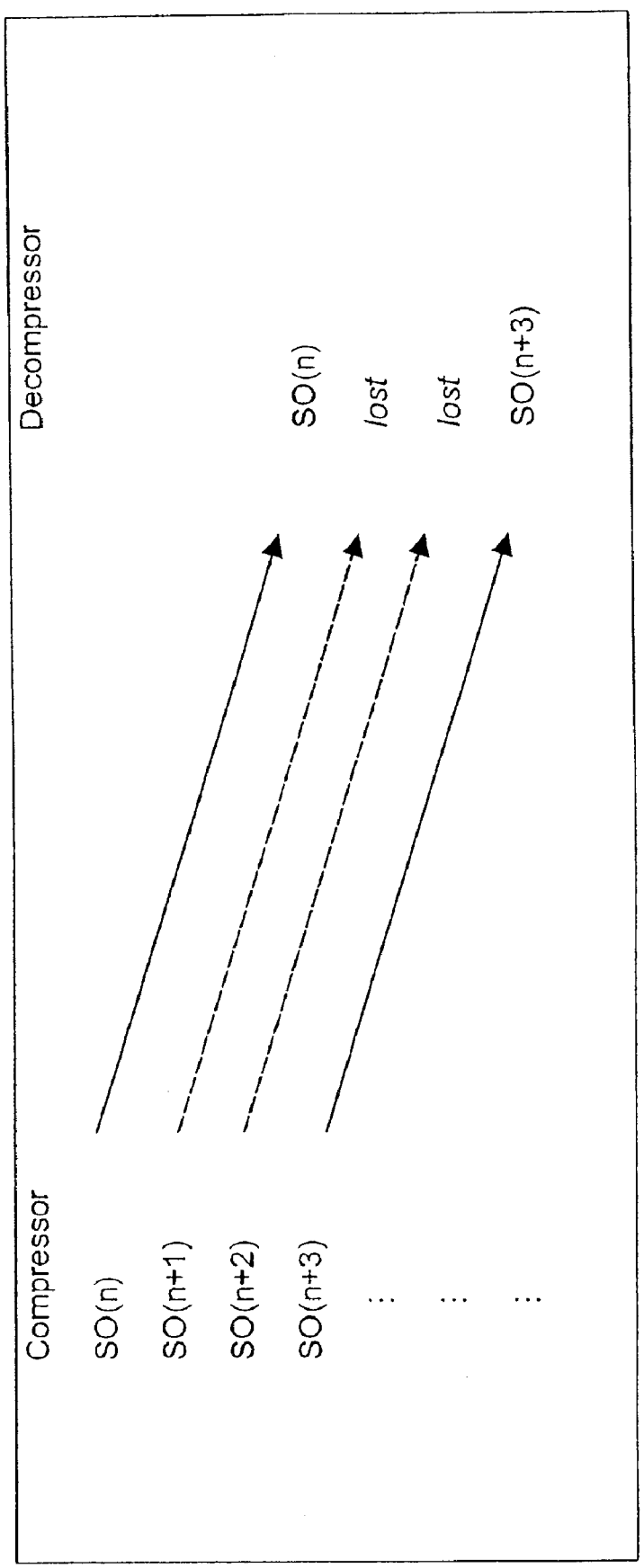
FIG. 11 illustrates extrapolation of packets received by the decompressor to recover headers of lost packets in accordance with the present invention.

FIG. 11 illustrates an embodiment of the invention in which the decompressor performs multiple extrapolation. When one or multiple consecutive SO headers belonging to a string are lost or corrupted, the decompressor can decompress subsequent SO headers by applying an extrapolation function a necessary number of times. As shown in FIG. 11, it is assumed SO(n+1) and SO(n+2) are all lost. Let the corresponding changing value in SO(i) be X(i), then X(n+3) can be regenerated.

In the case when the extrapolation function is linear and the offset between two consecutively sent packets is X_Stride, regeneration of SO(n+3) is performed by applying an extrapolation function two times based on SO(n), i.e., $X(n+3)=X(n)+X\_Stride*((n+3)-n)$.

In the case when the extrapolation function is not linear and varies in a non-linear pattern(s), the decompressor can regenerate the headers according to the non-linear pattern(s). For example, if a changing value of X between consecutive packets falls into pattern X_Stride1, X_Stride2, X_Stride1, X_Stride2, and so on, then the decompressor regenerates X(n+3) as $X(n+3)=X(n)+(X\_Stride1+X\_Stride2)$.

Examples of X could be the time stamp and sequence number in the RTP header with multiple extrapolations using different extrapolation functions being used. A function of an extrapolation function is, for example, a product of different constants and a constant extrapolation function.

Each header arriving at the compressor of the transmitter can be modeled as a multi-dimensional vector with each component being equal to the value of a changing field in the header. For example, if the RTP sequence number SN and the RTP time stamp are the only changing fields in a header, each header to be compressed corresponds to a point in the 2-D space. Therefore, with the passage of time the compressor simply observes a sequence of points in this multi-dimensional space.

The coordinates of a point can be derived by applying a multi-dimensional extrapolation function to the immediately preceding point in the sequence. The extrapolation function may vary from packet to packet (or point to point in the space). However, if it stays the same for a sub-sequence of points, that sub-sequence becomes a string. Note that the extrapolation function may have any characteristics, though typically they are linear.

The concept of the string can be further optimized by the decompressor performing multiple extrapolation. When one or more consecutive SO headers belonging to a string are lost or corrupted between the compressor and decompressor, the decompressor can still decompress subsequent SO headers by applying the extrapolation function the necessary number of times. The number of times is determined by the jump in CD_SN. Note that the synchronization in the CD_SN is maintained when the counter has wraparounds.

If one or multiple SO headers are corrupted during the transmission, the decompressor may be able to repair the corrupted headers based on the previously and currently correctly received headers and extrapolation functions. When the decompressor receives packets with corrupted headers, it buffers the corrected packet rather than discarding the corrected packet. After the decompressor receives the next packet without corruption, the decompressor compares the number of packets buffered therein and the sequence number offset between the current correctly received packet and the previous correctly received packet. If the sequence number offset matches the number of packets it buffered, and all of these packets are in the same string, then the decompressor can recover the corrupted headers based on the known extrapolation function(s).

As illustrated in FIG. 11, assuming that the extrapolation function for value X in the header is linear and the offset between two consecutively sent packets is X_Stride, when decompressor receives SO(n+1) and SO(n+2) with corrupted headers, the decompressor buffers the packets and waits for the next packet. When the decompressor receives SO(n+3) and observes that the sequence number offset between current correctly received packet SO(n+3) and previous correctly received packet SO(n) is 2 and the number of packets buffered therein between these two packets are 2 as well, the decompressor can regenerate value X of the two packets with corrupted headers as X(n+1)=X(n)+X_Stride and X(n+2)=X(n)+2*X_Stride. Examples of value X can be time stamp and sequence number in RTP header. This process has applications in which delay can be tolerated such as with streaming.

Another enhancement is compressor sequence number compensation. The compressor performs sequence number compensation when the RTP sequence number of the header to be compressed does not increase by 1 (increases by more than 1 or decreases), but the compressor determines that the header still belongs to the same string as the previous string. This happens when some headers in a string are lost or misordered on the way to the compressor. In that case, the header is compressed as an FO header, but only an RTP sequence number difference SND is sent as update information. SND=(actual RTP SN of the compressed header)− (RTP SN of the header obtained by straight extrapolation from the CD_SN). SND allows the decompressor to determine the correct RTP sequence number. For example, consider the sequence of headers with RTP Sequence Number= 5, 6, 7, 8 and 9 all belonging to the same string. On the way to the compressor of the transmitter, headers 7 and 8 are lost. Consequently, the compressor sees an increment of more than 1 when header 9 is received. However, from inspection of the uncompressed fields, the compressor of the transmitter determines that header 9 belongs to the same string as header 6. Assume header 6 was compressed with CD_SN= 3. Now header 9 is compressed with CD_SN=4, since CD_SN is always incremented by 1. The compressor of the transmitter also sends a SND=9−7=2. The decompressor of the receiver adds SND to the CD_SN, then applies the normal decompression algorithm for SO.

In a case of misordering only (no packet loss before compressor), there will be a sequence of SO headers with SNDs, but eventually the SND will become zero. Once the SND is zero, no SND is needed in the compressed header, and the compressed header is just a normal SO. If packets are lost before they reach the compressor of the transmitter, the SND will not go to zero. The SND needs to be carried in each header until the compressor receives an acknowledgment from the decompressor. Otherwise, if the header containing the SND is lost, the decompressor cannot decompress correctly.

Figure 12:
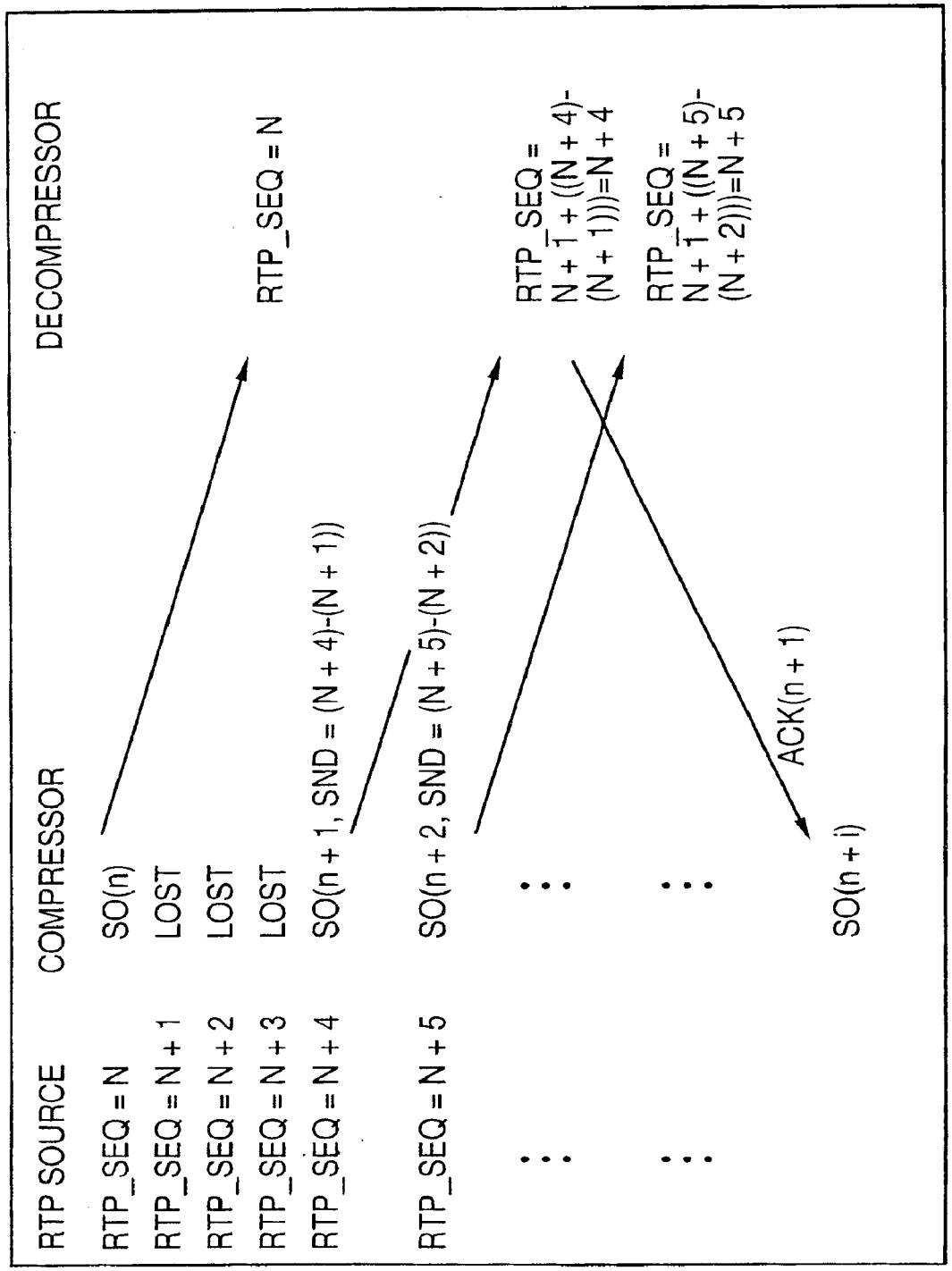
FIG. 12 illustrates sequence number compensation in accordance with the present invention when packets are lost.

FIG. 12 illustrates an embodiment of the invention in which compressor sequence number compensation occurs when the RTP sequence number of the header to be compressed doesn't increase by 1 due to packet loss, and the compressor determines that the header still belongs to the same string as the previous one. It is assumed in this example, packets with RTP sequence number N+1, N+2, N+3 are all lost. The compressor only receives packets with RTP sequence number N and N+4, with N and N+4 belonging to the same string. When the compressor sends the compressed header for the packet with the RTP sequence number N+4, in addition to short sequence number n+2, the compressor also needs to send an RTP sequence number difference SND which in the example equals to (N+5)− (N+2). When the decompressor receives such packet, it adds the SND to the CD_SN to derive the correct sequence number, then applies the normal decompression algorithm for SO.

Figure 13:
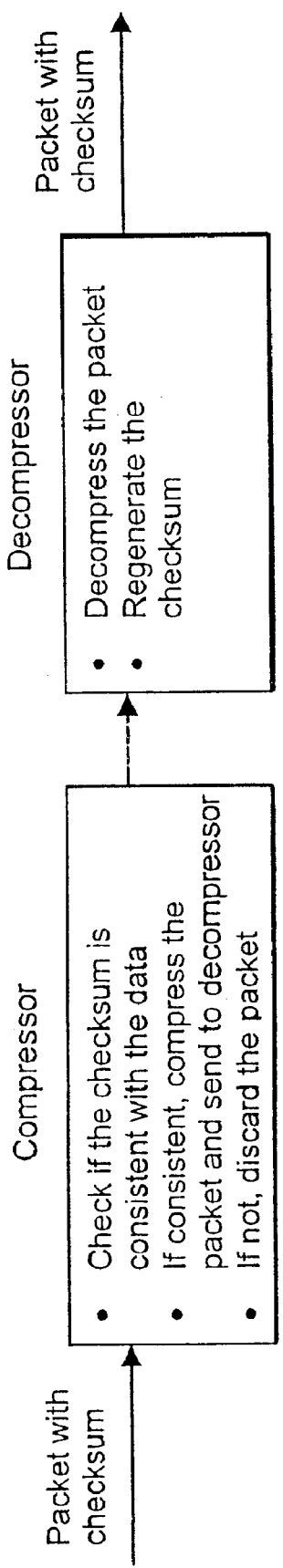
FIG. 13 illustrates error detection upstream of a decompressor to reduce transmission bandwidth in accordance with the present invention.

FIG. 13 illustrates an embodiment of the invention which performs error detection and regeneration of error detection code which is used to limit transmission bandwidth. It is assumed in the following description that an error detection mechanism, such as a UDP checksum (2 bytes), is not transferred over the communication channel between the compressor and decompressor as the (CD_CC). This is not an issue if the UDP checksum is not used by the end application. If the end application uses the UDP checksum, and it is necessary to send the UDP checksum end-to-end, the embodiment can be extended in a straightforward fashion by adding the uncompressed UDP checksum in each compressed header. However, even if the UDP checksum is not sent as the CD_CC, some information related to the UDP checksum can be conveyed to the compressor.

One option is to split the end-to-end UDP checksum into two parts: the segment between the source and the compressor is referred to as the upstream segment and the segment between the compressor and the decompressor is referred to as the downstream segment. The error detection process using the checksum may be only carried out in the upstream segment. Before sending a UDP packet, the compressor checks if the checksum is consistent with the data and the compressor compresses the packet. If it is not, the packet will be discarded or the packet is sent with the checksum discarded and an error flag added which informs the decompressor that the received packet contains erroneous data with the discarding of the error detection bits in the form of the checksum (or other error detection bits) prior to transmission thus saving transmission bandwidth. The decompressor relies instead on the error detection capabilities of the CD_CC. If no error is reported to the decompressor, the decompressor re-calculates the checksum after de-compressing the packet.

The above solutions work only if there is an error detection mechanism in the CD_CC and has the same or greater capability than the UDP checksum.

Before compressing a packet, the compressor checks if the checksum is consistent with the data. If it is, as stated above, the compressor compresses the packet without including the checksum in the compressed packet and transmits the compressed packet to the decompressor. If it is not, the compressor may discard the packet, or transmit the packet with checksum, or transmit the packet without checksum but with or without error indication.

FIGS. 14A–F illustrate an example of the format of SO, ACK, FO, FH, FO EXT and FH REQ packets which may be used with the practice of the present invention. The following abbreviations apply: PT is the packet type, C_RTP_SN is the compressed RTP sequence number, C_RTP_TS is the compressed RTP time stamp and C_IP_ID is the compressed IP_ID. However, it should be understood that the present invention is not limited thereto. The PT field for the SO packet may be encoded as 0, the ACK packet as 10, the FO packet as 110, the FH packet as 1110, the FO_EXT packet as 11110 and the FH_REQ packet as 111110. In the FO and FO_EXT packets, M is a one bit marker in the RTP header. In the FO packet, T is a one bit flag which 1 if C_RTP_TS is present and zero otherwise and I is a one bit flag which is set to 1 if C_IP_ID is present and is zero otherwise. In FH packets, IP and UDP headers can be compressed if the packet length is provided by a lower layer at the decompressor. The FO_EXT packet is transmitted only if several non-essential fields have change; the bit mask is used to indicate which fields are present and C_RTP_TS and C_IP_ID is always be present making T and I bit flags not necessary. Finally, the FH_REQ packet is sent only under exceptional circumstances, such as a system crash.

A context identifier (CID) field may need to be added to each of the above headers if multiple RTP flows are compressed and the lower layer does not provide differentiation among flows. The CID may only be needed for one direction, such as in a cellular system when the mobile station (MS) has only one RTP flow in each direction, and CID is not needed for downlink traffic (including ACKs). The quantity CID must be included for uplink traffic (including ACKs) since the decompression at the network side always handles multiple flows.

The following is an example of pseudo code which may be used to write code for the compressor.

This example illustrates the case where two ACKs are needed to transition from the update phase to the extrapolation phase. For simplicity, the alternation of FH and FO packets, as illustrated in FIG. 8 and the sequence number compensation are not shown in the pseudo-code.

In this example, S_DFOD and R_DFOD are assumed non-static. They are therefore determined by the compressor and decompressor on a dynamic basis as follows:

The quantity S_DFOD is calculated as CFO(m) when the compressor received ACK(n) and ACK(n-p) and (n-p) $\geq$ N_Last_Interr. Note that p is not necessarily equal to 1.

The decompressor calculates R_DFOD when it receives the first SO packet after a non-SO packet. The quantity R_DFOD is calculated by using a linear extrapolation based on the last two acknowledged headers stored in OAW 135.

The compressors behavior can be modeled as a state machine, specified by the table below.

To address the counter wrap-around and long error burst problem, the compressor expects to receive an ACK at least once every seq_cycle headers, and maintains an extended flag. If the flag is true, the compressor shall operate in the extended mode, i.e. send (CD_SN)l_extended. Otherwise, it sends (CD_SN)$_k$. The extented flag is set to true whenever N_elapsed>seq_cycle. Otherwise, it is set to false. Note that N_elapsed keeps increasing unless the transmitter receives an ACK (refer to pseudo code for details). In the extended mode, if ext_cycle have elapsed without an acknowledgment, the transmitter transitions to FH state.

The compressor enters the SO state when at least two packets with CD_SN$\geq$N_Last_Interr have been acknowledged. Then it sets S_DFOD equal to the most recent CFO.

Initially, the compressor starts the session in the FH state. The HSW 117 is empty. The quantity N_elapsed is set to zero. Extended_flag is set to false.

Extra procedures need to be executed in the case of handoff. For simplicity, they are not included here.

FH state

| Event | Action |
|---|---|
| receive ACK(n) for FH(n) | see compressor processing ACK(n) pseudo code state ← FO_STATE; |

In the FH state, the procedure to send header(n) is

```
{
    calculate CFO(n) and update N_Last_Interr;
    send as FH(n);
    store header(n) in HSW, color B red;        /* n in FH is coded in k_extended bits */
}
```

FO state

| Event | Action |
|---|---|
| receive ACK(n) for FO(n, m) | see Compressor processing ACK(n) pseudo code |
| Receive FH_Req | state ← FH_STATE; |

In the FO state, the procedure to send header(n) is

```
{
    calculate CFO(n) and update N_Last_Interr;
    if N_elapsed >= seq_cycle
        extended_flag B TRUE;
    else
        extended_flag B FALSE;
    if N_elapsed >= ext_cycle
    {
        send FH(n), store header(n) in SHW, color B red;
        state β FH_STATE;
        N_elapsed B 0;
    }
    if received more than two ACKs, AND the most recent two
    CD_SNs ACKed >= N_Last_Interr
    {
        S_DFOD B CFO(n);
        send SO(n), store header(n) in HSW, color B current_color( ); /* see
function below */
        state B SO_STATE;
    }
    else
        send FO(n, S_RFH); store header(n) in HSW,
        color B current_color( );
        N_elapsed B N_elapsed + 1;
}
current_color( ) {
    if extended_flag = TRUE
        return red;
    else
        return green;
}
```

SO state

| Event | Action |
|---|---|
| Receive ACK(n) | see compressor processing ACK(n) pseudo code |
| Receive FH_Req | State ← FH_STATE |

In the SO state, the procedure to send header(n) is

```
{
    calculate CFO(n) and update N_Last_Interr;
    if N_elapsed >= seq_cycle
        extended_flag B TRUE;
    else
        extended_flag B FALSE;
    if N_elapsed >= ext_cycle
    {
        send FH(n), store header(n) in SHW, color = red;
        state B FH_STATE;
        N_elapsed B 0;
    }
    if CFO(n) = S_DFOD
        send SO(n); store header(n) in HSW, color B current_color( );
    else
    {
        send FO(n, S_RFH); store header(n) in HSW, color
            B current_color( );
        state B FO_STATE;
    }
    N_elapsed BN_elapsed + 1;
}
Compressor processing ACK(n)
{
    if color of ACK(n) is green           /* n is coded in k bits */
        h_ack β is green header in HSW 117 whose (CD_SN)k = n; /* see
below for detailsr */
    else                                  /* n is coded in k_extended
bits */
        h_ack β a red header in HSW 117 whose (CD_SN)k_extended = n;
    S_RFH β CD_SN of h_ack;
    Delete all headers in HSW preceding (older than) h_ack;
    Move h_ack to Header(S_RFH);
    N_elapsed β Diff(current|CD_SN, S_RFH): |
}
```

It can be proved that in the above procedure, one and only one header in the HSW 117 can be correctly identified as the header being ACKed, in other word(s), there will be no ambiguity of the ACK. If the ACK(n) is red, i.e., n is coded using 1_extended bits, only one red header can match the ACK, since there are at most $2^{\Gamma\_extended}$ headers in the HSW 117. Otherwise, if the ACK(n) is green, we will show that it can be uniquely map to a green header in HSW 117.

Assume a snapshot of the HSW 117 is taken every time after the compressor sends a packet, and represents it with a string of letter Rs (for red headers) and Gs (for green headers). Let S be the string corresponding to an arbitrary snapshot. Note that S starts with the oldest packet sent by the transmitter, and ends with the youngest one. Furthermore, between the sending of two consecutive packets by the compressor, the string S does not change unless an ACK arrives during the time, which will some letters from the beginning of the S.

Now, let G1 denote the rightmost (youngest) G in S, and S1 as the prefix of S up to (including) G1. Then there are only two possible cases, as shown below.

Case 1

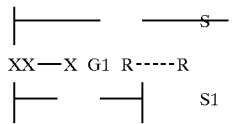

-continued

Case 2

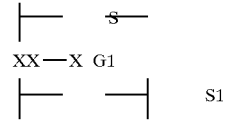

Let len(S1) denote the length of S1. In case 1, since there is an R after G1, len(S1) must be equal to seq_cycle (=2%). Otherwise, the compressor would not have sent the packet after G1 as a red one. In case 2, len(S1)≦seq_cycle must be true. Otherwise, the compressor would have sent G1 as a red one. Therefore, in either case, len(S1) is less or equal to seq_cycle.

Since G1 is the rightmost green letter in S, it is proven that at most $2^k$ green header can exist in HSW 117 at any time. Thus, when a green ACK is received by the compressor, the k-bit CD_SN in the ACK can be used to uniquely identify a green header in the HSW.

Note that the decompressor must cooperate with the compressor to ensure that synchronization of CD_SN is maintained during the transition between the two modes. First, if the decompressor receives a red packet and it decides to ACK that packet, it must send a red ACK carrying (CD_SN)1_extended.

Second, if the decompressor receives an FO packet, FO(n, m), the correct reference header must be the youngest (most recent) header in OAW 135, whose least significant k (if m is k-bit) or 1_extended (if m is k_extended-bit) bits match m. Note that this relies on the assumption that, in each direction, the channel behaviors like a FIFO.

Figure 1:
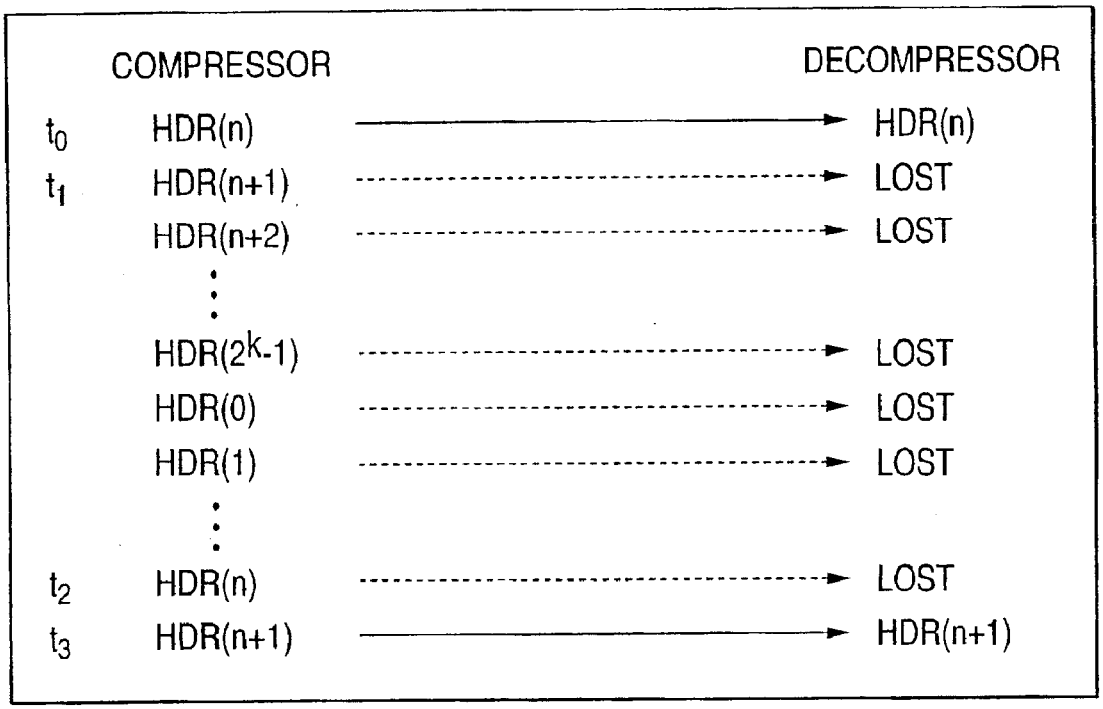
FIG. 1 illustrates the deficiency of packet loss WITH RFC 2508.
Figure 19:
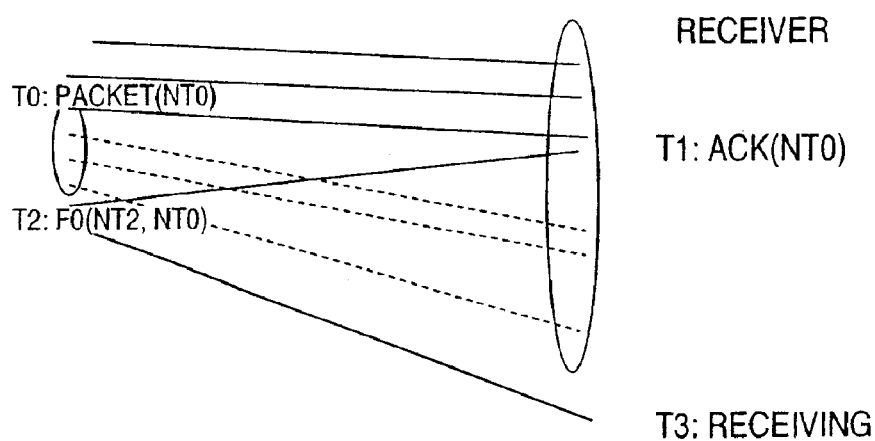
FIG. 19 graphically illustrates a comparison of the invention with RFC 2508.

FIG. 19 illustrates the second condition. In this example, NT0 and NT2 are the values of CD_SN at time T0 and T2, respectively. Suppose at T1, the compressor sends packet ACK(NT0), in which NT0 is coded in 1_extended bits. At T2, the compressor receives the ACK(NT0). It then calculates N_elapsed equal to (NT2−NT0) and finds out that N_elapsed<seq_cycle. At the same time, a RTP packet arrives at the compressor and the compressor decides to send it as an FO packet, using header(NT0) as reference. Since N_elapsed<seq_cycle(=2%), the NT2 and NT0 in the FO packet are coded in k bits. At T3, the FO arrives at the decompressor. To retrieve the correct reference header, the decompressor simply searches its OAW from tail (the most recent) to head (the oldest), and finds the first header whose least significant k bits of its CD_SN match $(NT0)_k$.

Note that at T3, the OAW 135 of the decompressor may contain more than $2^k$ headers. However, the above operation always gives the correct reference header. Because of the FIFO property of the forward channel, whatever received (and thus Acked) by the decompressor between T1 and T3, must be sent by the compressor between T0 and T2. In other words, if A denotes the set of the headers in OAW 135 that were added after header (NT0), and B the set of headers in HSW 117 at T2, then A⊆B always holds. Since $|A|<2^k$, we have $|B|<2^k$. Therefore, there are no two headers in set B such that the least significant k bits of their CD_SNs match (NT0)k in the packet FO(NT2, NT0). The following is an example of pseudo code for the decompressor:

The decompressor is mostly driven by what is received from the compressor (i.e. FH, FO or SO).

In what follows, "correctly received" means no error is detected in the received header (either FH, FO or SO). Besides aforementioned state information, the decompressor also maintains a copy of the last reconstructed header, i.e., header (R_Last_Decomp). When receiving an FO packet the decompressor will use the procedure described above with reference to the pseudo code of the compressor to retrieve the correct reference header.

```
If FH(n) is correctly received
{
    reconstruct header(n) from FH(n);
    send ACK(n);
    R_Last_Acked-n;
    store header(n) in the OAW 135 and also header(R_Last_Decomp);
}
if FO(n, m) is correctly received
{
    if header(m) cannot be found in the OAW 135   /* could only happen due to system
    failures */
        Send FH_Req;
    else
    {
        retrieve header (m) for the OAW 135 or header (R_RFH);
        delete headers in OAW that are older than header (R_RFH);
        reconstruct header(n)-FO_DIFF(n, m) + header(m);
        if R_RFH!=m
            R_RFH-m and store header(m) as header(R_RFH);
        if FO(n, m) is one of the first two FO packets received or
            N_RT FO packets have been received since last ACKed FO packet
        {
            Send ACK(n);
            R_Last_Acked-n; store header (n) in the OAW:
        }
        store reconstructed header (n) in header(R_Last_Decomp);
    }
}
If SO(n) is correctly received
{
    if it's the first SO packet after a non-SO packet
    {
        find the two most recently reconstructed headers in OAW 135;
        if not found                              /* could only happen due to system
failure */
            Send FH_Req;
        else                             /*let the two headers be header (p) and
header (q), p<q*/
            R_DFOD+FO_DIFF(q,p)/Diff(q,p);
    }
    reconstruct header(n)-R_DFOD * Diff(n, R_Last_Decomp) +
header(R_Last_Decomp);
    store header(n) in header(R_Last_Decomp);
    if    1)   (seq_cycle - N_RT) packets have elapsed since R_Last_ACKed, or,
    /* time to send a periodic ack */
          2)   extended_flag in SO is ON and this is the first such packet, or,
                     /* the compressor switches to extended mode; send ack so the
compressor returns to normal mode */
          3)   received more than N_RT packets with extended_flag ON since
R_Last_ACK
             /* the previous ack was apparently not received; send another ack */
    {
        Send ACK(n); n is coded in extended mode if conditions 2 or 3 are met
        R_Last_Acked-n;
        store Header (n) in the OAW;
    }
}
    store header(n) in the OAW 135 and also header(R_Last_Decomp);
}
if FO(n, m) is correctly received
{
    if header(m) cannot be found in the OAW 135   /* could only happen due to system
    failures */
            Send FH_Req;
    else
    {
        retrieve header (m) for the OAW 135 or header (R_RFH);
        delete headers in OAW that are older than header (R_RFH);
        reconstruct header(n)-FO_DIFF(n, m) + header(m);
        if R_RFH!=m
            R_RFH-m and stored header(m) as header(R_RFH);
        if FO(n, m) is one of the first two FO packets received or
            N_RT FO packets have been received since last ACKed FO packet
        {
            send ACK(n);
            R_Last_Acked-n; store header (n) in the OAW:
        }
        store reconstructed header (n) in header(R_Last_Decomp);
}
```

```
if SO(n) is correctly received
{
    if it's the first SO packet after a non-SO packet
    {
        find the two most recently reconstructed headers in OAW 135;
        if not found                                    /* could only happen due to system failure */
            Send FH_Req;
        else                                 /*let the two headers be header (p) and header (q), p<q*/
            R_DFOD+FO_DIFF(q,p)/Diff(q,p);
    }
    reconstruct header(n)-R_DFOD * Diff(n, R_Last_Decomp) + header(R_Last_Decomp);
    store header(n) in header(R_Last_Decomp);
    if  1) (seq_cycle - N_RT) packets have elapsed since R_Last_ACKed, or,
        /* time to send a periodic ack */
        2) extended_flag in SO is ON and this is the first such packet, or,
            /* the compressor switches to extended mode; send ack so the compressor returns to normal mode */
        3) received more than N_RT packets with extended_flag ON since R_Last_ACK
            /* the previous ack was apparently not received; send another ack */
    {
        Send ACK(n); n is coded in extended mode if conditions 2 or 3 are met
        R_Last_Acked-n:
        store Header (n) in the OAW;
    }
}
```

HSW 117 and OAW 135

In the worst case, where the round trip delay is actually equal to RTT_UB, the OAW 135 or HSW 117 may need to hold $2^{l\text{-}extended}$ headers. However, that is very unlikely to happen. In most cases, less than $2^k$ entries need to be maintained in the HSW 117 or OAW 135. In practice this means a pretty small number of entries for both OAW and HSW. For example, 16 (k=4) entries will provide 320 msec of round trip time, assuming a 20 msec spacing per packet.

Static fields do not need to be stored as multiple entries in HSW 117 or OAW 135. Only a single copy of the static fields is needed.

In RFC 2508, each compressed header carries a sequence number. In most cases, the sequence number is enough to reconstruct the full header by linear extrapolation. For those packets where linear extrapolation would result in incorrect header reconstruction, the compressor sends a first order difference information with respect to the immediately preceding packet. Thus, the loss of a packet will invalidate subsequent packets with compressed headers, since the lost packet could be carrying FO difference information. RFC 2508 relies solely on the 4-bit sequence number to detect packet losses. The sequence number wraps around every 16 packets. When an error burst longer than 16 packets occurs, there is a 1 in 16 probability of not detecting errors, which is unacceptably high. Furthermore, even if the decompressor were able to detect errors, to recover from errors, the decompressor has to request the compressor to send a large size header by sending a CONTEXT_STATE message. Thus there is a round trip delay incurred before the requested header reaches the receiver. In the case of real-time conversational traffic, this delay translates into a break in the conversation. In addition, sending a large size header is expensive in terms of bandwidth.

An embodiment of the present invention uses a k-bit sequence number (k could be set equal to 4) for linear extrapolation. Like RFC 2508, when linear extrapolation would result in incorrect header reconstruction, the compressor sends a FO difference information. Unlike RFC 2508, the difference is calculated with respect to a reference packet known to be correctly received. That packet is not necessarily the one immediately preceding the current packet. This feature ensures that the current header can be reliably reconstructed even if one or more past packets were lost. Since the header can be reliably reconstructed in that manner, there is no need to send a full header. The first order difference information can most of the time be encoded with fewer bits than the absolute value of the full header. The FO difference header has an additional field that carries the reference number, i.e. sequence number of the reference packet. To guarantee that errors will be detected even in the present of long error bursts, the decompressor sends an ACK frequently enough so that the compressor receives an ack at least once every seq_cycle packets. In the absence of such an ACK, the compressor will presume that there may be a long error burst. In most cases, it is then enough that the compressor simply switch to a l_extended-bit sequence number, where L_extended is large enough to avoid any ambiguity. In any event, the loss of a packet will not invalidate subsequent packets with compressed headers. Therefore, when the decompressor detects a packet loss, it does not have to request retransmission.

Figure 20:
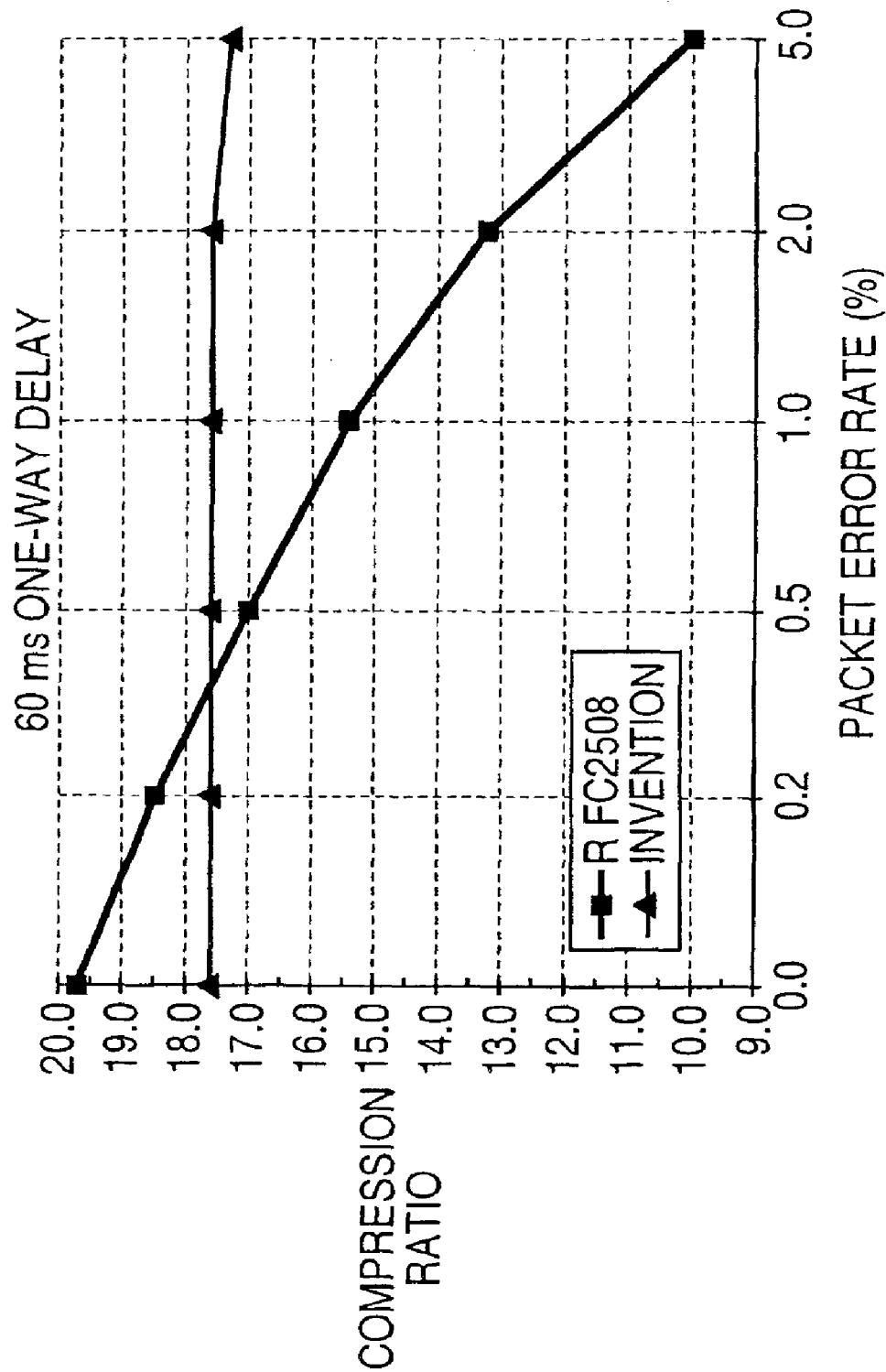
FIG. 20 illustrates a graphical analysis of the performance of the present invention.

FIG. 20 below shows comparative results of prior art RFC 2508 with the invention. One way (fixed) delay of 60 ms is assumed in this test. The inter spacing between RTP packets is 30 ms. The random error model is used with different average packet error rates. The compression ratio is defined as the ratio between average size of compressed headers and the size of the original IP/UDP/RTP headers. Note that with the invention, the size of ACK packets is included in the calculation of the average compressed header size. The invention outperforms the RFC 1508 as soon as the packet error rate is higher than 0.4%.

The robust scheme of the invention requires the compressor and decompressor to maintain the HSW 117 and OAW 135 queues, respectively. Assuming that the roundtrips are less than 320 msec, the size of the queues is 16 entries+one copy of the static fields.

|                                                              | lpv4                | lpv6                |
| ------------------------------------------------------------ | ------------------- | ------------------- |
| Size of static fields (in bytes)                             | 18                  | 40                  |
| Size of one entry (in bytes)                                 | 22                  | 20                  |
| Total size of HSW or OAW for one bi-directional session (in bytes) | (16*22 + 18)*2 = 740 | (16*20 + 40)*2 = 720 |

About 1 megabyte of memory will allow to handle more than 1400 sessions simultaneously. The processing load to manage the queues is very moderate, as it involves pointer manipulation.

While the invention has been described in terms of its preferred embodiments, it should be understood that numerous modifications of the invention may be made without departing from the spirit and scope of the invention. It is intended that such modifications fall within the scope of the appended claims.

What is claimed is:

1. In a system having a transmitter transmitting a plurality of packets each containing a header to a receiver, a method of synchronizing the transmission of compressed headers between the transmitter and receiver comprising:

transmitting a current packet from the transmitter to the receiver containing information that the transmitter is prepared to send subsequently transmitted packets in which the headers therein are to be compressed in comparison to the header contained in the current packet; and transmitting from the receiver to the transmitter an acknowledgment packet that the receiver has received the current packet.

2. A method in accordance with claim 1 wherein:

the transmitter stores the header of the current packet which has been acknowledged as being received by the receiver as a reference header which is used in the transmission of the subsequently transmitted packets as a reference header to be used by the receiver to decompress the subsequent headers;

the receiver stores the header of the current packet, which is acknowledged, for decompressing the compressed headers of the subsequently transmitted packets;

the transmitter transmits the subsequent packets using the stored header of the current packet as a reference header; and the receiver uses the stored referenced header to decompress the compressed headers of the subsequently transmitted received packets to produce a full header which is not compressed.

3. A method in accordance with claim 2 wherein:

the header of the current packet is a first order compressed header; and the compressed header of the subsequently transmitted packets is a second order compressed header.

4. A method in accordance with claim 2 wherein:

the header of the current packet is a full header; and the compressed header of the subsequently transmitted packets is a second order compressed header.

5. A method in accordance with claim 1 wherein:

the header of the current packet is a first order compressed header; and the compressed header of the subsequently transmitted packets is a second order compressed header.

6. A method in accordance with claim 1 wherein:

the header of the current packet is a full header; and the compressed header of the subsequently transmitted packets is a second order compressed header.

7. A system comprising:

a transmitter which transmits a plurality of packets each containing a header;

a receiver which receives the transmitted plurality of packets; and wherein the transmitter transmits a current packet to the receiver containing information that the transmitter is prepared to send subsequently transmitted packets in which the headers therein are to be compressed in comparison to the current packet and the receiver transmits an acknowledgment packet that the receiver has received the current packet; and wherein the header of the current packet is one of a full header or a first order compressed header; and the compressed header of the subsequently transmitted packets is a second order compressed header.

8. A system in accordance with claim 7 wherein:

the transmitter stores the header of the current packet, which has been acknowledged as being received by the receiver, as a reference header that is used in the transmission of the subsequently transmitted packets as a reference header to be used by the receiver to decompress the subsequent headers;

the receiver stores the header of the current packet which is acknowledged as a reference header for decompressing the compressed headers of the subsequently transmitted packets;

the transmitter transmits the subsequent packets using the stored header of the current packet as a reference header; and the receiver uses the stored reference header to decompress the compressed headers of the subsequently transmitted received packets to produce a full header which is not compressed.

9. A system in accordance with claim 8 wherein:

the header of the current packet is a first order compressed header; and the compressed header of the subsequently transmitted packets is a second order compressed header.

10. A system in accordance with claim 8 wherein:

the header of the current packet is a full header; and the compressed header of the subsequently transmitted packets is a second order compressed header.

11. A system in accordance with claim 7 wherein:

the header of the current packet is a first order compressed header; and the compressed header of the subsequently transmitted packets is a second order compressed header.

12. A system in accordance with claim 7 wherein:

the header of the current packet is a full header; and the compressed header of the subsequently transmitted packets is a second order compressed header.

13. In a system having a transmitter transmitting a plurality of packets each containing a header to a receiver, a method of synchronizing transmission of first order compressed headers between the transmitter and receiver comprising:

transmitting a current packet to the receiver containing a first order compression header with a number of the current packet in the plurality of packets being coded by an extended sequence number having I bits;

in response to reception of the current packet containing the first order header, transmitting from the receiver to the transmitter an acknowledgment packet that the receiver has received the current packet containing the first order compressed header; and in response to reception of the acknowledgment packet, the transmitter transmits subsequent packets each containing a sequence number having non-extended sequence number having K bits with l>k.

14. A method in accordance with claim 13 wherein:

the transmitter stores the header of the current packet, which has been acknowledged as being received by the receiver, as a reference header that is used in the transmission of the subsequently transmitted packets containing a first order compressed header as a reference header to be used by the receiver to decompress the subsequent headers;

the receiver stores the header of the current packet, which is acknowledged as a reference header, for decompressing the compressed headers of the subsequently transmitted packets containing a first order compressed header; the transmitter transmits subsequent packets containing the first order compressed header using the stored header of the current packet as a reference header; and the receiver decompresses the compressed headers of the subsequently transmitted received packets containing the first order compressed header with the stored reference header to produce a full header which is not compressed.

15. A method in accordance with claim 14 wherein:

the receiver detects at least one lost packet in the subsequently transmitted packets by comparison of the sequence numbers of successively received transmitted packets.

16. A method in accordance with claim 15 wherein:

a number of missing packets is determined between an immediately previously received packet and the current packet;

the number of determined missing packets is added to a packet number of the immediately previously received packet to a number of the current packet to update a number of the current packet in a sequence of transmission of the plurality of packets; and decompressing a sequence number of the current packet using the updated number and decompressing additional fields of information using the stored reference header.

17. A method in accordance with claim 14 wherein:

a number of missing packets is determined between an immediately previously received packet a nd the current packet;

the number of determined missing packets is added to a packet number of the immediately previously received packet to a number of the current packet to update a numb er of the current packet in a sequence of transmission of the plurality of packets; and decompressing a sequence number of the current packet using the updated number and decompressing additional fields of information using the stored reference header.

18. A method in accordance with claim 13 wherein:

the receiver detects at least one lost packet in the subsequently transmitted packets by comparison of the sequence numbers of successively received transmitted packets.

19. In a system having a transmitter transmitting a plurality of packets each containing a header to a receiver, a method of synchronizing transmission of first order compressed headers between the transmitter and receiver comprising:

transmitting a plurality of packets to the receiver each containing a first order compressed header with a number of each of the plurality of packets in an order of transmission being defined by a sequence number having l extended bits; and detecting at least one lost packet in the transmitted plurality of packets between a current packet and a last packet when a difference DIFF equals DIFF (CD_SN_CURR, CD_SN_LAST) wherein CD_SN_LAST is an absolute packet number of a last received packet and CD_SN_CURR is an absolute packet number of the current packet.

20. A method in accordance with claim 19 wherein:

a number of lost packets $N_{loss}$ is calculated to be equal to DIFF EXT(CD_SN_CURR, CD_SN_LAST) is equal to (CD_SN_CURR)−(CD_SN_LAST).

21. A system comprising:

a transmitter which transmits a plurality of packets each containing a header; and a receiver which receives the plurality of packets each containing a header; and wherein a current packet is transmitted by the transmitter to the receiver containing a first order compression header with a number of the plurality of packets being coded by a multiple bit sequence number, in response to reception of the current packet containing the first order header the receiver transmits to the transmitter an acknowledgment packet that the receiver has received the current packet containing the first order compressed header and the transmitter in response to reception of the acknowledgment packet transmits subsequent packets each containing a sequence number in the plurality of packets having a reduced number of bits compared to a number of bits in the sequence number of the current packet.

22. A system in accordance with claim 21 wherein:

the transmitter stores the header of the current packet, which has been acknowledged as being received by the receiver, as a reference header that is used in the transmission of the subsequently transmitted packets containing a first order compressed header as a reference header to be used by the receiver to decompress the subsequent headers;

the receiver stores the header of the current packet, which is acknowledged as a reference header, for decompressing the compressed headers of the subsequently transmitted packets containing a first order compressed header;

the transmitter transmits subsequent packets containing the first order compressed header using the stored header of the current packet as a reference header; and the receiver decompresses the compressed headers of the subsequently transmitted received packets containing the first order compressed header with the stored reference header to produce a full header which is not compressed.

23. A system in accordance with claim 22 wherein:

the receiver detect s at least one lost packet in the subsequently transmitted packets by comparison of the sequence numbers of successively received transmitted packets; and the header of a packet by the receiver immediately after a last in time lost packet is decompressed using the stored reference header and using a detected number of lost packets.

24. A system in accordance with claim 23 wherein:

a number of missing packets is determined by the receiver between an immediately previously received packet and the current packet;

the number of determined missing packets is added by the receiver to a packet number of the immediately received packet to a number of the current packet to update a number of the current packet in a sequence of transmission of the plurality of packets; and the receiver decompresses a sequence number of the current packet using the updated number and additional fields of information using the stored reference header.

25. A system in accordance with claim 22 wherein:

a number of missing packets is determined by the receiver between an immediately previously received packet and the current packet;

the number of determined missing packets is added by the receiver to a packet number of the immediately received packet to a number of the current packet to update a number of the current packet in a sequence of transmission of the plurality of packets; and the receiver decompresses a sequence number of the current packet using the updated number and additional fields of information using the stored reference header.

26. A system in accordance with claim 21 wherein:

the receiver detects at least one lost packet in the subsequently transmitted packets by comparison of the sequence numbers of successively received transmitted packets; and the header of a packet received immediately after a last in time lost packet is decompressed using a detected number of lost packets.

27. In a system having a transmitter transmitting a plurality of packets each containing a header to a receiver, a method of synchronizing the transmission of headers between the transmitter and receiver comprising:

transmitting from the receiver to the transmitter periodic acknowledgments which are individually transmitted to the transmitter with a spacing such that the transmitter receives an acknowledgment at least once every N packets where $N=2^K$ and k is a number of bits used to number the packets in sequence; and in an absence of the transmitter receiving a properly timed acknowledgment from the receiver, the receiver increases the number of bits defining the sequence number to be l extended bits wherein l extended is larger than k.

28. A method in accordance with claim 27 wherein:

the receiver can detect a maximum number of lost packets equal $2^{l\ extended}$ bits.

29. A method in accordance with claim 28 wherein:

the transmitter, in response to a subsequently received acknowledgment, reduces the number of bits in the sequence numbers from l extended bits to k bits.

30. A method in accordance with claim 27 wherein:

the transmitter, in response to a subsequently received acknowledgment, reduces the number of bits in the sequence numbers from l extended bits to k bits.

31. In a system having a transmitter which transmits a plurality of packets to a receiver, each of the packets containing a header, a method of maintaining sequence synchronization during transmission of packets having compressed headers between the transmitter and the receiver comprising:

initiating transmission of packets having compressed headers by transmitting from the transmitter to the receiver a packet having a full header;

transmitting from the transmitter to the receiver, subsequent to transmission of the packet having the full header, packets having compressed headers, each compressed header containing information related to the full header of the packet having a full header; and periodically transmitting from the receiver to the transmitter an acknowledgment packet indicating that the packets having the compressed headers have been received.

32. A method according to claim 31, wherein the transmitting comprises:

sequentially adding to the compressed header of each of the packets having compressed headers a sequence number which is incremented by one for each sequential packet of the packets having compressed headers, the sequence number has a predetermined number of bits.

33. A method according to claim 32, further comprising:

when the transmitter has not received the acknowledgment packet, extending the number of bits of the sequence number beyond the predetermined number of bits.

34. A method of reducing a number of bits contained in headers of a sequence of transmitted data packets comprising:

transmitting at least one sequence of data packets from a transmitter to a receiver with each sequence containing at least one packet containing a full header followed by at least one packet containing a compressed header having fewer bits than the full header;

in response to one of the data packets received by the receiver containing a full header transmitting from the receiver to the transmitter an acknowledgment that the receiver has received the one data packet containing the full header; and in response to the receiving of the acknowledgment by the transmitter, transmitting at least one subsequent data packet from the transmitter to the receiver with a header which is further compressed beyond the compression of the at least one header in the at least one sequence.

35. A method in accordance with claim 34 wherein:

the compressed headers of the at least one sequence are first order compressed headers; and the compressed header of the at least one subsequent packet is a second order compressed header.

36. A method in accordance with claim 35 wherein:

a plurality of sequences of packets are transmitted.

37. A method in accordance with claim 36 wherein:

the receiver generates the acknowledgment in response to a first received packet containing a full header.

38. A method in accordance with claim 37 wherein:

the receiver transmits at least one additional acknowledgment to the transmitter in response to reception of the at least one packet containing a compressed header.

39. A method in accordance with claim 35 wherein:

the at least one additional acknowledgment is generated in response to a first packet in the at least one sequence.

40. A method in accordance with claim 36 wherein:

the receiver transmits at least one additional acknowledgment to the transmitter in response to reception of the at least one packet containing a compressed header.

41. A method in accordance with claim 40 wherein:

the at least one additional acknowledgment is generated in response to a first packet in the at least one sequence.

42. A method in accordance with claim 35 wherein:

the receiver generates the acknowledgment in response to a first received packet containing a full header.

43. A method in accordance with claim 42 wherein:

the receiver transmits at least one additional acknowledgment to the transmitter in response to reception of the at least one packet containing a compressed header.

44. A method in accordance with claim 43 wherein:
the at least one additional acknowledgment is generated in response to a first packet in the at least one sequence.

45. A method in accordance with claim 35 wherein:
the receiver transmits at least one additional acknowledgment to the transmitter in response to reception of the at least one packet containing a compressed header.

46. A method in accordance with claim 45 wherein:
the at least one additional acknowledgment is generated in response to a first packet in the at least one sequence.

47. A method in accordance with claim 34 wherein:
a plurality of sequences of packets are transmitted.

48. A method in accordance with claim 47 wherein:
the receiver generates the acknowledgment in response to a first received packet containing a full header.

49. A method in accordance with claim 48 wherein:
the receiver transmits at least one additional acknowledgment to the transmitter in response to reception of the at least one packet containing a compressed header.

50. A method in accordance with claim 49 wherein:
the at least one additional acknowledgment is generated in response to a first packet in the at least one sequence.

51. A method in accordance with claim 47 wherein:
the receiver transmits at least one additional acknowledgment to the transmitter in response to reception of the at least one packet containing a compressed header.

52. A method in accordance with claim 51 wherein:
the at least one additional acknowledgment is generated in response to a first packet in the at least one sequence.

53. A method in accordance with claim 34 wherein:
the receiver generates the acknowledgment in response to a first received packet containing a full header.

54. A method in accordance with claim 53 wherein:
the receiver transmits at least one additional acknowledgment to the transmitter in response to reception of the at least one packet containing a compressed header.

55. A method in accordance with claim 54 wherein:
the at least one additional acknowledgment is generated in response to a first packet in the at least one sequence.

56. A method in accordance with claim 36 wherein:
the receiver transmits at least one additional acknowledgment to the transmitter in response to reception of the at least one packet containing a compressed header.

57. A method in accordance with claim 56 wherein:
the at least one additional acknowledgment is generated in response to a first packet in the at least one sequence.

58. A method of reducing a number of bits contained in headers of a sequence of transmitted packets comprising:
transmitting at least one sequence of packets from a transmitter to a receiver with each sequence containing at least one packet containing a first header followed by at least one packet containing a second header which is compressed by having fewer bits than the first header;
in response to one of the packets received by the receiver containing the first header transmitting from the receiver to the transmitter an acknowledgment that the receiver has received the one packet containing the first header; and
in response to the receiving of the acknowledgment by the transmitter, transmitting at least one subsequent packet from the transmitter to the receiver with a third header which is further compressed beyond the compression of the second compressed header.

59. A method in accordance with claim 58 wherein:
the second compressed header is a first order compressed header; and
the third header is a second order compressed header.

60. A method in accordance with claim 59 wherein:
a plurality of sequences of packets are transmitted.

61. A method in accordance with claim 60 wherein:
the receiver generates the acknowledgment in response to a first received packet containing the first header.

62. A method in accordance with claim 61 wherein:
the receiver transmits at least one additional acknowledgment to the transmitter in response to reception of the at least one packet containing a compressed header.

63. A method in accordance with claim 62 wherein:
the at least one additional acknowledgment is generated in response to a first packet in the at least one sequence.

64. A method in accordance with claim 60 wherein:
the receiver transmits at least one additional acknowledgment to the transmitter in response to reception of the at least one packet containing a compressed header.

65. A method in accordance with claim 64 wherein:
the at least one additional acknowledgment is generated in response to a first packet in the at least one sequence.

66. A method in accordance with claim 59 wherein:
the receiver generates the acknowledgment in response to a first received packet containing the first header.

67. A method in accordance with claim 66 wherein:
the receiver transmits at least one additional acknowledgment to the transmitter in response to reception of the at least one packet containing a compressed header.

68. A method in accordance with claim 67 wherein:
the at least one additional acknowledgment is generated in response to a first packet in the at least one sequence.

69. A method in accordance with claim 59 wherein:
the receiver transmits at least one additional acknowledgment to the transmitter in response to reception of the at least one packet containing a compressed header.

70. A method in accordance with claim 69 wherein:
the at least one additional acknowledgment is generated in response to a first packet in the at least one sequence.

71. A method in accordance with claim 58 wherein:
a plurality of sequences of packets are transmitted.

72. A method in accordance with claim 71 wherein:
the receiver generates the acknowledgment in response to a first received packet containing the first header.

73. A method in accordance with claim 72 wherein:
the receiver transmits at least one additional acknowledgment to the transmitter in response to reception of the at least one packet containing a compressed header.

74. A method in accordance with claim 73 wherein:
the at least one additional acknowledgment is generated in response to a first packet in the at least one sequence.

75. A method in accordance with claim 71 wherein:
the receiver transmits at least one additional acknowledgment to the transmitter in response to reception of the at least one packet containing a compressed header.

76. A method in accordance with claim 75 wherein:
the at least one additional acknowledgment is generated in response to a first packet in the at least one sequence.

77. A method in accordance with claim 58 wherein:
the receiver generates the acknowledgment in response to a first received packet containing the first header.

78. A method in accordance with claim 77 wherein:
the receiver transmits at least one additional acknowledgment to the transmitter in response to reception of the at least one packet containing a compressed header.

79. A method in accordance with claim 78 wherein:
the at least one additional acknowledgment is generated in response to a first packet in the at least one sequence.

80. A method in accordance with claim 58 wherein:
the receiver transmits at least one additional acknowledgment to the transmitter in response to reception of the at least one packet containing a compressed header.

81. A method in accordance with claim 80 wherein:

the at least one additional acknowledgment is generated in response to a first packet in the at least one sequence.

82. A method of reducing a number of bits contained in headers of a sequence of transmitted packets comprising:

transmitting at least one sequence of packets from a transmitter to a receiver with each sequence containing at least one packet containing a full header or a first order compressed header followed by at least one packet containing a compressed header having fewer bits than the full header or a first order compressed header; and in response to one of the packets received by the receiver containing a full header or a first order compressed header transmitting from the receiver to the transmitter an acknowledgment that the receiver has received the one packet containing the full header; and wherein the compressed header of the subsequently transmitted packets is a second order compressed header.

83. A method of reducing a number of bits contained in headers of a sequence of transmitted packets comprising:

transmitting at least one sequence of packets from a transmitter to a receiver with each sequence containing at least one packet containing a first header followed by at least one packet containing a second header which is compressed by having fewer bits than the first header; and in response to one of the packets received by the receiver containing the first header transmitting from the receiver to the transmitter an acknowledgment that the receiver has received the one packet containing the first header.

84. A method of transmitting headers from a compressor to a decompressor comprising:

transmitting at least one packet from a compressor to a decompressor;

in response to receiving the at least one packet at the decompressor transmitting at least one feedback to the compressor signalling that the decompressor has received the at least one packet; and in response to the feedback, the compressor transmits at least one additional packet to the decompressor which has a smaller number of bits in a header of the at least one additional packet than a number of bits of a header in the at least one packet.

85. A method in accordance with claim 84 wherein:

each header of the at least one packet is a full header; and each header of the at least one additional packet is a first order header.

86. A method in accordance with claim 84 wherein:

each header of the at least one packet is a first order header; and each header of the at least one additional packet is a second order header.

87. A method in accordance with claim 84 wherein:

the feedback is an acknowledgment packet.

88. A method of transmitting headers from a compressor to a decompressor comprising:

transmitting a plurality of packets from a compressor to a decompressor;

in response to receiving at least one packet at the decompressor, transmitting at least one feedback to the compressor signalling that the decompressor has received at least one of the plurality of packets; and transmitting at least one additional packet from the compressor to the decompressor which has a smaller number of bits in a header of the at least one additional packet than a number of bits of a header in the at least one packet when whichever first occurs of (1) a transmission of a predetermined number of packets of the at least one packet, or (2) reception of the at least one feedback.

89. A method in accordance with claim 88 wherein:

each header of the at least one packet is a full header; and each header of the at least one additional packet is a first order header.

90. A method in accordance with claim 88 wherein:

each header of the at least one packet is a first order header; and each header of the at least one additional packet is a second order header.

91. A method in accordance with claim 68 wherein:

the feedback is an acknowledgment packet.

92. A method in accordance with claim 88 wherein:

the predetermined number of packets is based upon a selection criteria.

93. A method in accordance with claim 92 wherein:

the selection criteria are based upon channel conditions involving transmissions to the decompressor from the compressor or transmissions from the decompressor to compressor.

94. A method of transmitting headers from a compressor to a decompressor comprising:

transmitting a plurality of packets from a compressor to a decompressor; and transmitting at least one additional packet from the compressor to the decompressor which has a smaller number of bits in a header of the at least one additional packet than a number of bits of a header in the plurality of packets when a transmission of a predetermined number of packets of the plurality of packets has occurred.

95. A method in accordance with claim 94 wherein:

the predetermined number of packets is based upon a selection criteria.

96. A method in accordance with claim 95 wherein:

the selection criteria are based upon channel condition s involving transmissions to the decompressor from the compressor or transmissions from the decompressor to compressor.

97. In a system having a transmitter which transmits a plurality of packets to a receiver, each of the packets containing a header, a method of maintaining sequence synchronization during transmission of packets having compressed headers between the transmitter and the receiver comprising:

initiating transmission of packets having headers by transmitting from the transmitter to the receiver a packet having a header;

transmitting from the transmitter to the receiver, subsequent to transmission of the packet having the header, packets having compressed headers, each compressed header containing information related to the header of the packet; and nonperiodically transmitting from the receiver to the transmitter an acknowledgment packet indicating that the packets having the compressed headers have been received.

* * * * *